United States Patent
Hattori

(10) Patent No.: US 9,047,391 B2
(45) Date of Patent: Jun. 2, 2015

(54) SEARCHING APPARATUS, SEARCHING METHOD, AND COMPUTER PROGRAM PRODUCT

(75) Inventor: Masakazu Hattori, Kanagawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 428 days.

(21) Appl. No.: 13/217,775

(22) Filed: Aug. 25, 2011

(65) Prior Publication Data

US 2012/0102025 A1 Apr. 26, 2012

(30) Foreign Application Priority Data

Oct. 25, 2010 (JP) .................................. 2010-238531

(51) Int. Cl.
G06F 7/00 (2006.01)
G06F 17/30 (2006.01)

(52) U.S. Cl.
CPC .... *G06F 17/30926* (2013.01); *G06F 17/30545* (2013.01)

(58) Field of Classification Search
None
See application file for complete search history.

(56) References Cited

U.S. PATENT DOCUMENTS

| 7,475,058 | B2* | 1/2009 | Kakivaya et al. ...................... 1/1 |
| 2006/0031204 | A1* | 2/2006 | Liu et al. ............................. 707/3 |
| 2008/0208843 | A1* | 8/2008 | Nagasawa ........................... 707/5 |
| 2009/0019007 | A1* | 1/2009 | Niina ................................. 707/3 |
| 2009/0132544 | A1 | 5/2009 | Hattori |
| 2009/0198657 | A1 | 8/2009 | Hattori |
| 2009/0198705 | A1 | 8/2009 | Hattori |
| 2009/0222458 | A1 | 9/2009 | Hattori |

FOREIGN PATENT DOCUMENTS

| JP | 2003-308334 | 10/2003 |
| JP | 2003-316783 | 11/2003 |
| JP | 2005-208757 | 8/2005 |

(Continued)

OTHER PUBLICATIONS

C. Ré, Jim Brinkley, Kevin Hinshaw, and Dan Suciu. "Distributed XQuery". Workshop on Information Integration on the Web (IIWeb), 2004, p. 116-121.*

(Continued)

*Primary Examiner* — Robert Beausoliel, Jr.
*Assistant Examiner* — Michael Pham
(74) *Attorney, Agent, or Firm* — Amin, Turocy & Watson, LLP

(57) ABSTRACT

In a searching apparatus: a first receiving unit receives a search request from a client; based on the search request, a first generating unit generates a distributed search request to request a server to conduct a search and an integration request to integrate search results of the distributed search request; a first transmitting unit transmits the distributed search request to the server; a second transmitting unit transmits identification information of an execution result of the integration request to the client; a second receiving unit receives, from the client, an obtainment request to obtain the execution result identified by the identification information; a receiving unit receives the search results of the distributed search request from the server; an executing unit executes the integration request on the received search results; and a third transmitting unit transmits the execution result of the integration request to the client that transmitted the obtainment request.

8 Claims, 23 Drawing Sheets

(56) References Cited

FOREIGN PATENT DOCUMENTS

| JP | 2007-206945 | 8/2007 |
| JP | 2007-257083 | 10/2007 |
| JP | 2007-265248 | 10/2007 |
| JP | 2008-243078 | 10/2008 |
| JP | 2009-211154 | 9/2009 |
| JP | 2010-176319 | 8/2010 |

OTHER PUBLICATIONS

"Locating Nodes With Path Expressions in XQuery", copyright 1993-2014, www.progress.com, Access date Aug. 18, 2014. http://www.progress.com/products/data-integration-suite/data-integration-suite-developer-center/data-integration-suite-tutorials/learning-xquery/xquery---a-guided-tour/locating-nodes-with-path-expressions-in-xquery.*

Japanese Office Action for Japanese Application No. 2010-238531 mailed on Jul. 10, 2012.

"Distributed XML database for managing and searching enormous XML data", Toshiba Review, Japan, Toshiba Corporation, Oct. 1, 2007, vol. 62, No. 10, pp. 62-63.

Zhang, et al., "XRPC: Interoperable and Efficient Distributed ZQuery", In Proceedings of VLDB, 2007, pp. 99-110.

Re, Christopher, et al., "Disrtributed XQuery", Workshop on Information Integration on the Web (IIWeb). 2004. p. 116-121.

Fernandez, Mary, et al., "Highly Distributed XQuery with DXQ" SIGMOD 2007, Beijing, China, ACM978-1-59593-686-8/07/0006, Jun. 11-14, 2007.

* cited by examiner

FIG.6

```
SYNTAX ANALYSIS OF GET MESSAGE;
switch (MESSAGE TYPE) {
case gquery:
  EXECUTE VIRTUAL PLANNER;
  break;
case query:
  EXECUTE XQuery;
  break;
case post:
  GENERATE RESOURCE;
  break;
case get:
  OBTAIN DATA CORRESPONDING TO RESOURCE;
  break;
case put:
  ASSIGN DATA TO RESOURCE;
  break;
case merge:
  ASSIGN MERGED DATA TO RESOURCE;
  break;
default:
  break;
}
```

FIG.14

```
for $x in doc("database.xml")//row
where contains($x//column3, "Kanagawa")
return $x
```

FIG.15

```
<doc>
 <row>
   <column1>XXX Government Office</column1>
   <column2>XXX, XXX Street</column2>
   <column3>Kanagawa Prefecture</column3>
 </row>
 <row>
   <column1>XXX Electric</column1>
   <column2>XXX, XXX Street</column2>
   <column3>Kanagawa Prefecture</column3>
 </row>
 <row>
   <column1>XXX Automobile</column1>
   <column2>XXX, XXX Street</column2>
   <column3>Kanagawa Prefecture</column3>
 </row>
 <row>
   <column1>XXX Department Store</column1>
   <column2>XXX, XXX Street</column2>
   <column3>Tokyo Prefecture</column3>
 </row>
 ....
</doc>
```

FIG.16

```
for $x in doc("database.xml")//row
where contains($x//column3, "Kanagawa")
return
<rec>
{<col0>{$x}</col0>}
</rec>
```

FIG.17 xml_d1

```
<rec>
 <col0>
  <row>
   <column1>XXX Government Office</column1>
   <column2>XXX, XXX Street</column2>
   <column3>Kanagawa Prefecture</column3>
  </row>
 </col0>
</rec>
<rec>
 <col0>
  <row>
   <column1>XXX Electric</column1>
   <column2>XXX, XXX Street</column2>
   <column3>Kanagawa Prefecture</column3>
  </row>
 </col0>
</rec>
<rec>
 <col0>
  <row>
   <column1>XXX Automobile</column1>
   <column2>XXX, XXX Street</column2>
   <column3>Kanagawa Prefecture</column3>
  </row>
 </col0>
</rec>
```

FIG.18

```
for $_0 in doc([uri_m])/root/rec
for $x in $_0/col0/*
return $x
```

FIG.19 xml_g

```
<row>
  <column1>XXX Government Office</column1>
  <column2>XXX, XXX Street</column2>
  <column3>Kanagawa Prefecture</column3>
</row>
<row>
  <column1>XXX Electric</column1>
  <column2>XXX, XXX Street</column2>
  <column3>Kanagawa Prefecture</column3>
</row>
<row>
  <column1>XXX Automobile</column1>
  <column2>XXX, XXX Street</column2>
  <column3>Kanagawa Prefecture</column3>
</row>
<row>
  <column1>YYY Business Office</column1>
  <column2>YYY, YYY Street</column2>
  <column3>Kanagawa Prefecture</column3>
</row>
<row>
  <column1>YYY Bank</column1>
  <column2>YYY, YYY Street</column2>
  <column3>Kanagawa Prefecture</column3>
</row>
```

FIG.20

```
let $d := doc("database.xml")//row/column3
hfor $x in distinct-values($d)
let $y :=
  for $z in doc("database.xml")//row
  where $z/column3 = $d
  return $z
let $w := count($y)
return
<shukei>
  <prefecture>{$x}</prefecture>
  <count>{$w}</count>
</shukei>
```

FIG.21

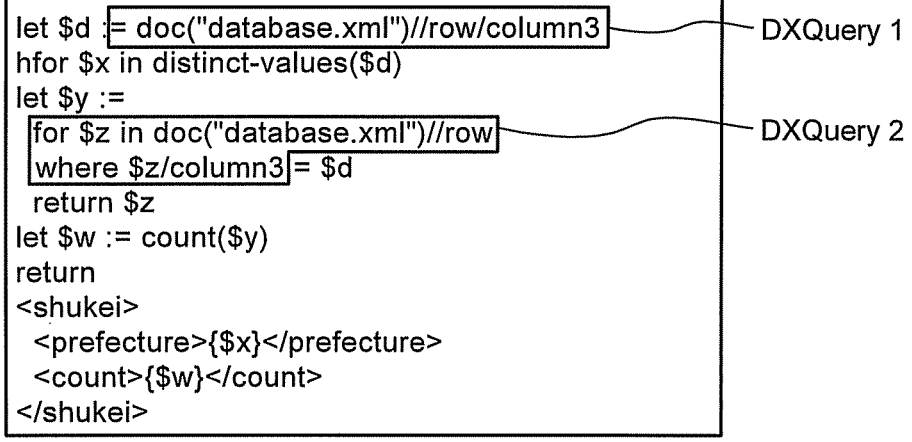

```
let $d := doc("database.xml")//row/column3        — DXQuery 1
hfor $x in distinct-values($d)
let $y :=
  for $z in doc("database.xml")//row              — DXQuery 2
  where $z/column3 = $d
  return $z
let $w := count($y)
return
<shukei>
  <prefecture>{$x}</prefecture>
  <count>{$w}</count>
</shukei>
```

FIG.22

```
let $d := doc("database.xml")//row/column3
return
<rec>
{for $_0 in $d return <col0>{$_0}</col0>}
</rec>
```

FIG.23

```
<rec>
 <col0>Kanagawa</col0>
</rec>
<rec>
 <col0>Kanagawa Prefecture</col0>
</rec>
<rec>
 <col0>Kanagawa Prefecture</col0>
</rec>
<rec>
 <col0>Tokyo Prefecture</col0>
</rec>
<rec>
 <col0>Niigata Prefecture</col0>
</rec>
<rec>
 <col0>Kanagawa</col0>
</rec>
.....
```

FIG.24

```
for $z in doc("database.xml")//row
let $_0 := $z/column3
return
<rec>
{<col0>{$z}</col0>}
{for $_1 in $_0 return <col1>{$_1}</col1>}
</rec>
```

FIG.25

```
<rec>
 <col0>
   <row>
     <column1>XXX Government Office</column1>
     <column2>XXX, XXX Street</column2>
     <column3>Kanagawa Prefecture</column3>
   </row>
 </col0>
 <col1>Kanagawa Prefecture</col1>
</rec>
<rec>
 <col0>
   <row>
     <column1>XXX Electric</column1>
     <column2>XXX, XXX Street</column2>
     <column3>Kanagawa Prefecture</column3>
   </row>
 </col0>
 <col1>Kanagawa Prefecture</col1>
</rec>
<rec>
 <col0>
   <row>
     <column1>XXX Automobile</column1>
     <column2>XXX, XXX Street</column2>
     <column3>Kanagawa Prefecture</column3>
   </row>
 </col0>
 <col1>Kanagawa Prefecture</col1>
</rec>
```

FIG.26

```
let $d :=
  for $_0 in doc([uri_m1])/root/rec
  for $_1 in $_0/col0/*
  return $_1
for $x in distinct-values($d)
let $y :=
  for $_2 in doc([uri_m2])/root/rec
  for $z in $_2/col0/*
  let $_3 := $_2/col1/*
  where $_3 = $x
  return $z
let $w := count($y)
<shukei>
  <prefecture>{$x}</prefecture>
  <count>{$w}</count>
</shukei>
```

FIG.27

```
<shukei>
  <prefecture>Kanagawa Prefecture</prefecture>
  <count>942</count>
</shukei>
<shukei>
  <prefecture>Tokyo Prefecture</prefecture>
  <count>2895</count>
</shukei>
<shukei>
  <prefecture>Niigata Prefecture</prefecture>
  <count>127</count>
</shukei>
....
```

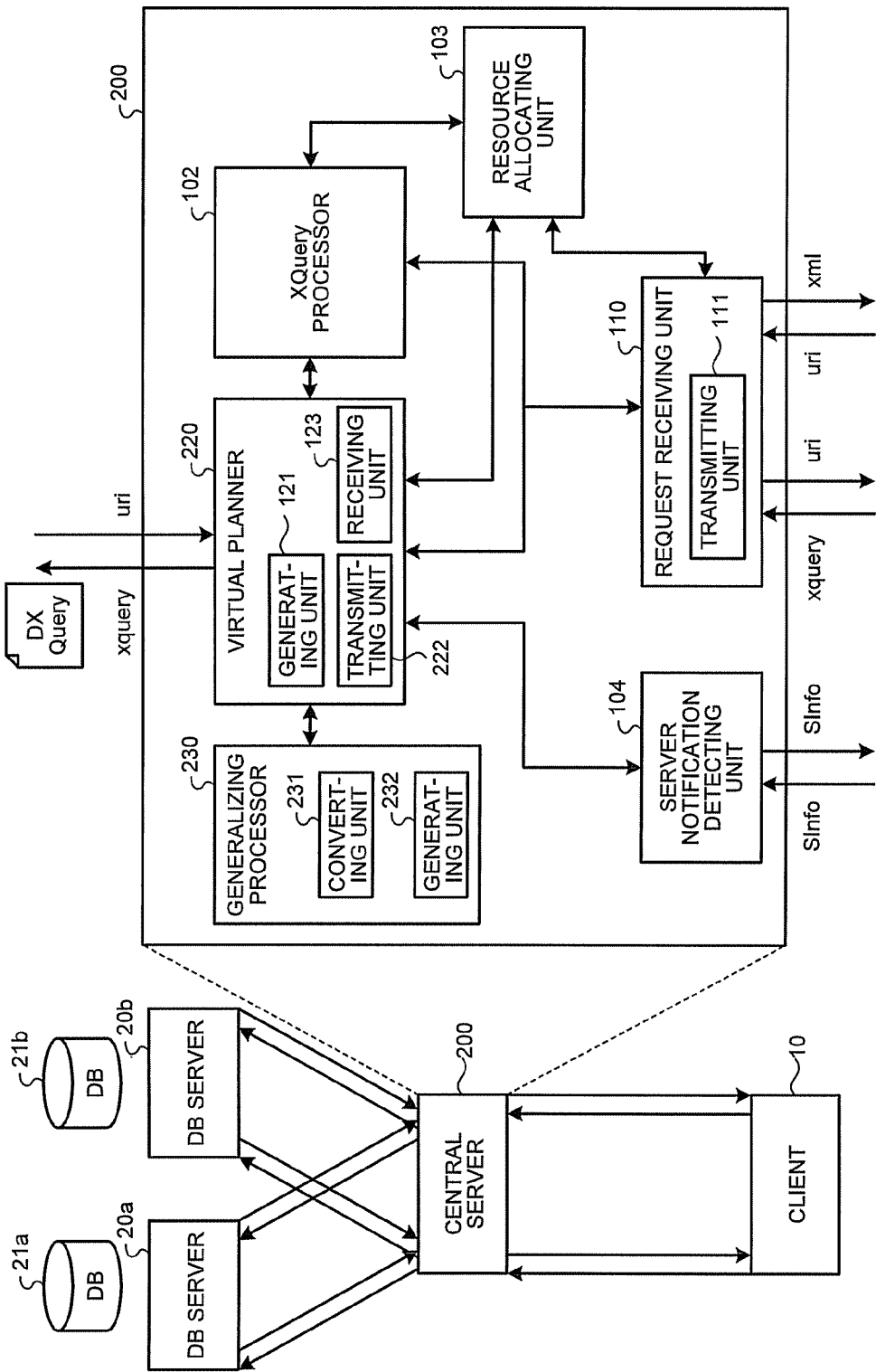

```
SERVICE http://example.com/?key=%1
XQuery for $x in doc("_")/* where contains($x, "%1") return $x
```

FIG.32

```
for $x in doc("database.xml")/*
where contains($x, "Kanagawa")
return
<rec>
{<col0>{$x}</col0>}
</rec>
```

FIG.33

```
for $_0 in doc([uri_d1])/rec
for $_1 in $_0/col0/*
for $x in $_1//row
where contains($x//column3, "Kanagawa")
return
<rec>
{<col0>{$x}</col0>}
</rec>
```

SEARCHING APPARATUS, SEARCHING METHOD, AND COMPUTER PROGRAM PRODUCT

CROSS-REFERENCE TO RELATED APPLICATION

This application is based upon and claims the benefit of priority from Japanese Patent Application No. 2010-238531, filed on Oct. 25, 2010; the entire contents of which are incorporated herein by reference.

FIELD

Embodiments described herein relate generally to a searching apparatus, a searching method, and a computer program product.

BACKGROUND

Distributed XQuery processing techniques for realizing XQuery processing by using a distributed system have been developed. However, attempts to realize distributed XQuery processing have just begun, and it is only possible to find some documents written about distributed XQuery processing.

XQuery Remote Procedure Call (XRPC), which is a type of distributed XQuery Processing, is a language extension of XQuery for different types of distributed data sources. XRPC realizes distributed XQuery with a technical feature called Remote Procedure Call (RPC) used as a built-in function for an XQuery.

BRIEF DESCRIPTION OF THE DRAWINGS

FIG. 6 is a drawing explaining request processing to perform a syntax analysis on a GET message and to sort processes;

FIG. 14 shows an example of an XQuery being input from a client;

FIG. 15 shows an example of data stored in a database (DB) shown in FIG. 2;

FIG. 16 shows an example of a DXQuery generated from the XQuery in FIG. 14;

FIG. 17 shows an example of a result XML that is an execution result of the DXQuery in FIG. 16;

FIG. 18 shows an example of a GXQuery generated from the XQuery in FIG. 14;

FIG. 19 shows an example of a result XML that is an execution result of the GXQuery in FIG. 18;

FIG. 20 shows another example of an XQuery being input from a client;

FIG. 21 explains a concept of a DXQuery generating process performed on the example shown in FIG. 20;

FIG. 22 shows an example of a DXQuery 1;

FIG. 23 shows an example of a result XML that is an execution result of the DXQuery 1 shown in FIG. 22;

FIG. 24 shows an example of a DXQuery 2;

FIG. 25 shows an example of a result XML that is an execution result of the DXQuery 2 shown in FIG. 24;

FIG. 26 shows an example of a GXQuery generated from the XQuery in FIG. 20;

FIG. 27 shows an example of a result XML that is an execution result of the GXQuery in FIG. 26;

FIG. 28 is a block diagram of an exemplary configuration of a central server according to a second embodiment;

FIG. 32 shows an example of a DXQuery being output in a generalizing process when the XQuery in FIG. 14 and the distributed server definition in FIG. 31 are input;

FIG. 33 shows an example of a VXQuery being output in a generalizing process when the XQuery in FIG. 14 and the distributed server definition in FIG. 31 are input;

DETAILED DESCRIPTION

Figure 1:
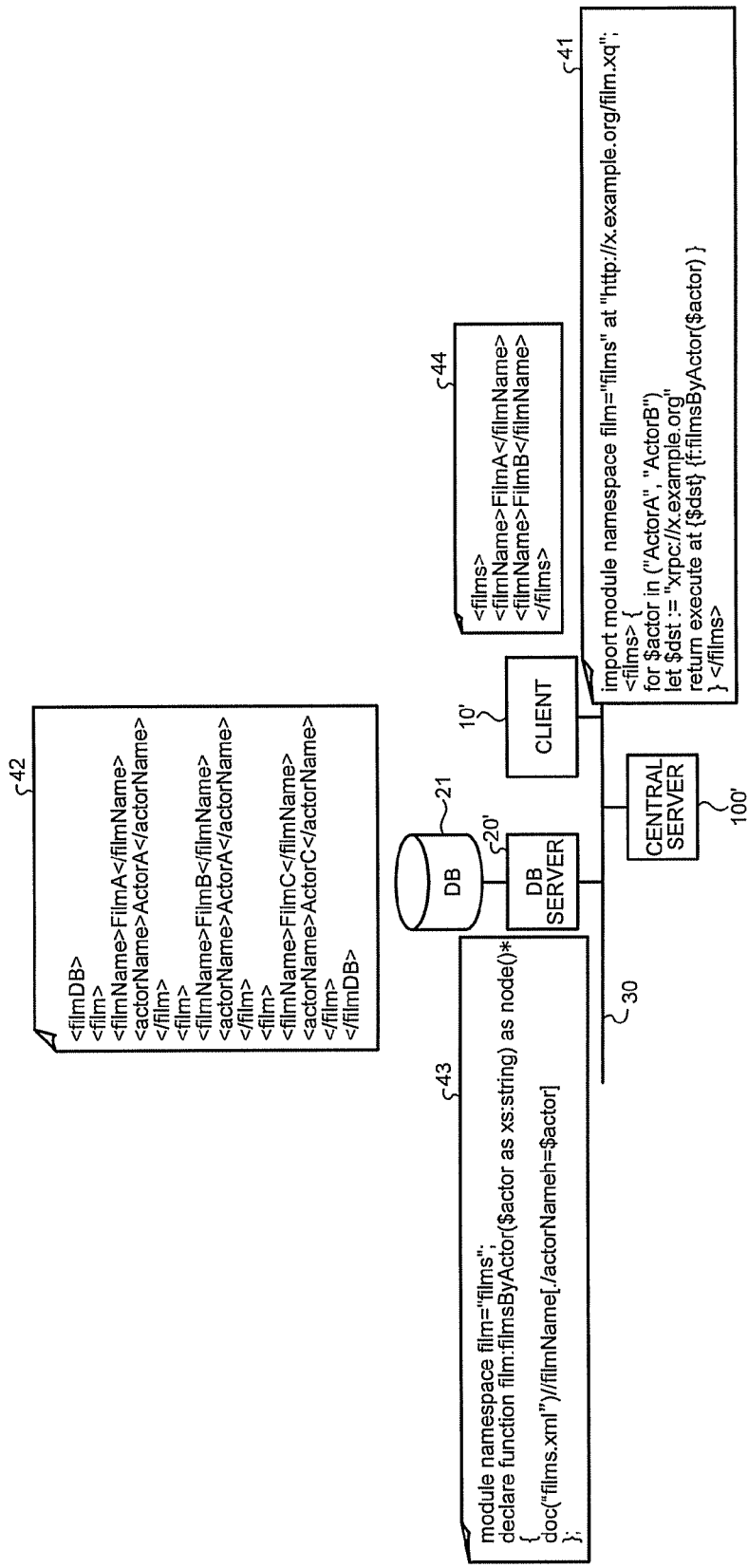
FIG. 1 is a block diagram of an exemplary configuration of a database system including a searching apparatus in which XQuery Remote Procedure Call (XRPC) is used.

With XRPC, which is a representative conventional technique to realize distributed XQuery processing, a problem remains where, for example, the user needs to explicitly describe XRPC in an XQuery, XRPC being a special language extension.

A searching apparatus according to an embodiment includes a first receiving unit, a first generating unit, a first transmitting unit, a second transmitting unit, a second receiving unit, a receiving unit, an executing unit, and a third transmitting unit. The first receiving unit receives a search request from a client. Based on the search request, the first generating unit generates a distributed search request to request a server to conduct a search and an integration request to integrate search results of the distributed search request. The first transmitting unit transmits the distributed search request to the server. The second transmitting unit transmits identification information of an execution result of the integration request to the client. The second receiving unit receives, from the client, an obtainment request to obtain the execution result identified by the identification information. The receiving unit receives the search results of the distributed search request from the server. The executing unit executes the integration request on the received search results. The third transmitting unit transmits the execution result of the integration request to the client that transmitted the obtainment request.

Exemplary embodiments of a searching apparatus will be explained in detail, with reference to the accompanying drawings. In the following sections, a system will be explained as an example in which a search is conducted on data in an Extensible Markup Language (XML) format in response to a search request in an XQuery format. However, the systems to which the embodiments are applicable are not limited to this example.

In XML, individual parts constituting a document structure are called "elements". Each of the elements is written by using tags. More specifically, each of the elements is expressed by enclosing text data between two tags that are namely a tag (a start tag) indicating the start of the element and a tag (an end tag) indicating the end of the element. The text data enclosed between the start tag and the end tag serves as a text element (a text node) contained in the one element expressed by using the start tag and the end tag.

XQuery is a functional language used for querying an XML database (an XML-Database Management System [DBMS]). A characteristic of an XQuery is a FLWOR (for-let-where-order by-return) structure. While Structured Query Language (SQL), which is a query language for a relational database (RDB), is a declarative language, XQuery in contrast has many characteristics of a functional language. In the following sections, language specifications of XQuery will be explained from a viewpoint of procedures.

A for clause is expressed by using a structure "for variable in expression". The structure of a for clause indicates that a member that satisfies the expression should be assigned to the variable so as to cause a loop. A let clause is expressed by using a structure "let variable :=expression". The structure of a let clause indicates that members that satisfy the expression should be aggregated and assigned to the variable as a sequence. The "sequence" is a flat list. A where clause limits the loop iterated by the for clause. A where clause is expressed by using a structure "where expression". The structure of a where clause indicates that only members satisfying the expression go through the loop, whereas members not satisfying the expression skip the loop. A return clause formats a result of processing an XQuery. A return clause is expressed by using a structure "return expression". By using the structure of a return clause, it is possible to describe arbitrary XML data containing variables. A variable is expressed by using a structure "$ character string". Except when being doubly declared due to a nested query or the like, variables having mutually the same character strings are considered as the same variable. As path operators each specifying a hierarchical condition between elements in XML data, the following operators can be used in an XQuery:

(1) "/": an operator indicating that the elements are in a parent-child relationship
(2) "//": an operator indicating that the elements are in an ancestor-descendant relationship
(3) ".": an arbitrary element As described above, XRPC is known as a distributed XQuery processing technique for realizing XQuery processing in a distributed system.

FIG. 1 is a block diagram of an exemplary configuration of a database system including a searching apparatus (a central server 100') in which XRPC is used. As shown in FIG. 1, the database system has a configuration in which the central server 100', a client 10', and a database (DB) server 20' including a database (DB) 21 are connected together via a network 30.

The client 10' requests the central server 100' to execute a query 41 written in an XQuery format. The query 41 indicates that "the function filmsByActor of an XQuery 43 that is present in the site x.example.org should be called with respect to Actor A and Actor B". The XQuery 43 indicates that "filmName having an actorName that matches the variable $actor should be extracted from an XML file 42".

An overview of the process to be performed when the query 41 is received will be explained below.

(1) The function filmsByActor is called with respect to "Actor A". Because the XML file 42 contains two items each of which includes "Actor A" in actorName, filmName of these two items are returned.
(2) The function filmsByActor is called with respect to "Actor B". Because the XML file 42 contains no item that includes "Actor B" in actorName, blank data is returned.
(3) The obtained filmName is expressed in an XML format written in the query 41. A result XML 44 represents the XML data obtained in this situation. The result XML 44 is obtained by adding the films elements to the top and the bottom of the filmName elements returned by the function. The XRPC technique has problems as described below:
(1) XQuery non-transparency: The user needs to explicitly describe XRPC in an XQuery, XRPC being a special language extension.
(2) Integration of mutually the same types: The DB server 20' needs to support XQuery and XRPC, as a query processing capability thereof. Consequently, it means that is not possible to perform a true virtualization on mutually different types of data.
(3) Issues with performance: When an RPC function is present in a for loop in an XQuery, the number of times an RPC message (in a Simple Object Access Protocol [SOAP] format) is transmitted and received increases. In addition, because an RPC function returns a single value, RPC functions are not suitable for returning a tuple. Further, because an XQuery inside XRPC is hidden as an RPC function, it is difficult to optimize a nested XQuery.

To cope with these problems, a virtual XML database system including a central server 100 serving as a searching apparatus according to a first embodiment is able to realize distributed XQuery processing without using XRPC.

Figure 2:
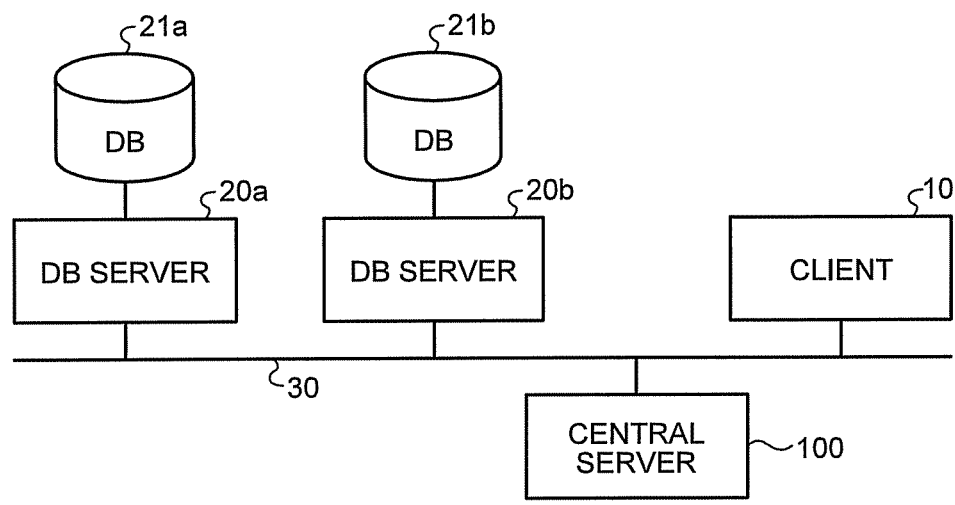
FIG. 2 is a block diagram of an exemplary configuration of a network for a virtual XML database system according to exemplary embodiments.

FIG. 2 is a block diagram of an exemplary configuration of a network for the virtual XML database system according to the first embodiment. In the virtual XML database system, a client 10, the central server 100, two DB servers 20a and 20b are connected together, via the network 30.

The DB servers 20a and 20b include databases (DB) 21a and 21b storing therein data in, for example, an XML format, respectively. Because the DB servers 20a and 20b have mutually the same technical features, the DB servers 20a and 20b may simply be referred to as the "DB servers 20" hereinafter.

The client 10 requests the central server 100 to execute a query written in an XQuery format. The network 30 may have an arbitrary network configuration such as a Local Area Network (LAN) or a Wide Area Network (WAN).

There are various communication protocols that can be used in the network 30; however, an example that uses an Internet Protocol (IP) network will be explained below, the IP network being a computer network in which mutual connections are realized by the Internet Protocol technology. The example is applicable even if a communication protocol other than IP is being used.

Figure 3:
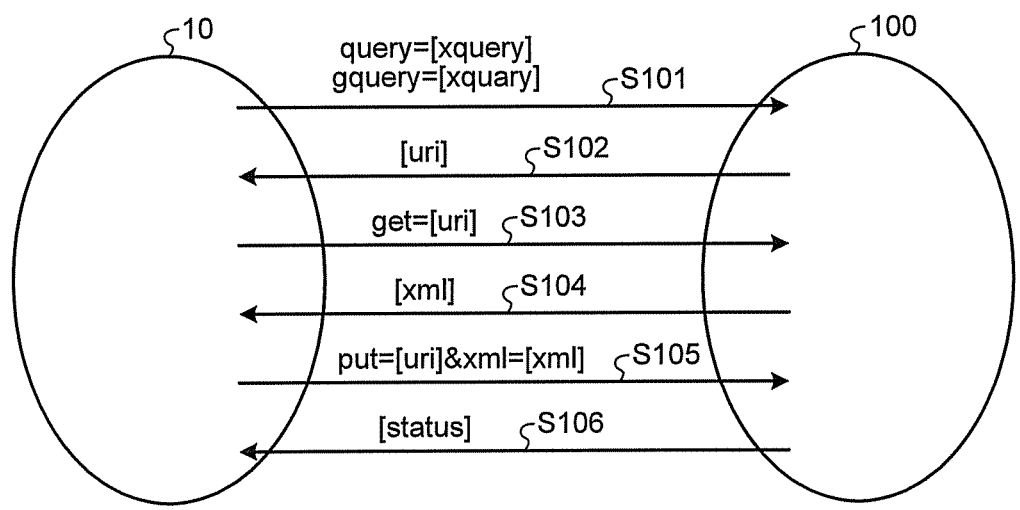
FIG. 3 is a drawing explaining a communication procedure using Hypertext Transfer Protocol (HTTP)

FIG. 3 is a drawing explaining a communication procedure using Hypertext Transfer Protocol (HTTP). Although FIG. 3 depicts an HTTP communication procedure between the client 10 and the central server 100, the same communication procedure is used in communication between the central server 100 and the DB servers 20. The communication procedure shown in FIG. 3 is obtained by extending a Representational State Transfer (REST).

REST is a style of a software architecture for a distributed hyper media system and is characterized with a stateless client/server protocol. An HTTP message contains all the information required for understanding the request (the message). For this reason, neither the client 10 nor the central server 100 needs to store therein the state of sessions between messages. Further, a number of methods that are frequently used are defined. Of those methods, important methods are: get, post, put, and delete.

In REST, a unique address expressed with a Uniform Resource Identifier (URI), which uniquely identifies a resource, is used. The URI serves as an argument for a method. URIs are obtained by extending the concept of Uniform Resource Locators (URLs). An URI is an identifier that specifies a resource while using a predetermined format. URIs were defined as Request for Comments (RFC) 2396 in 1998 and were revised as RFC 3986 in 2005.

For example, the URI of a resource "index.html" for "xxxx.ne.jp" can be expressed as http://www.xxxx.ne.jp/yyyy/public/index.html.

According to the first embodiment, REST is extended so as to include a method "query" and a method "gquery". As shown in (1) and (2) below, "query" and "gquery" are methods for requesting an execution of XQuery processing and an execution of distributed XQuery processing, respectively.

Examples of the methods used in the first embodiment are shown below. Hereinafter, "uri" and "uri_*" (where * is an arbitrary character string)" in lower case each denote an identifier expressed using an URI format. Further, "resource uri" and "resource uri_*" denote the resources identified by the identifiers "uri" and "uri_*", respectively.

(1) A Query Method

An XQuery ("xquery" in FIG. 3) is specified (step S101) and a resource uri for storing therein result XML data (hereinafter, a "result XML") of XQuery processing resulting from the specified XQuery is obtained (step S102).

(2) A gquery Method

An XQuery ("xquery" in FIG. 3) is specified (step S101) and a resource uri for storing therein a result XML of distributed XQuery processing resulting from the specified XQuery is obtained (step S102).

(3) A Get Method

A uri is specified (step S103) and a result XML to be stored into the resource identified by the specified uri is obtained (step S104).

(4) A Put Method

A uri and XML data are specified (step S105) so that the XML data is stored into the resource identified by the specified uri, and a stored result ("status" in FIG. 3) is obtained (step S106).

Figure 4:
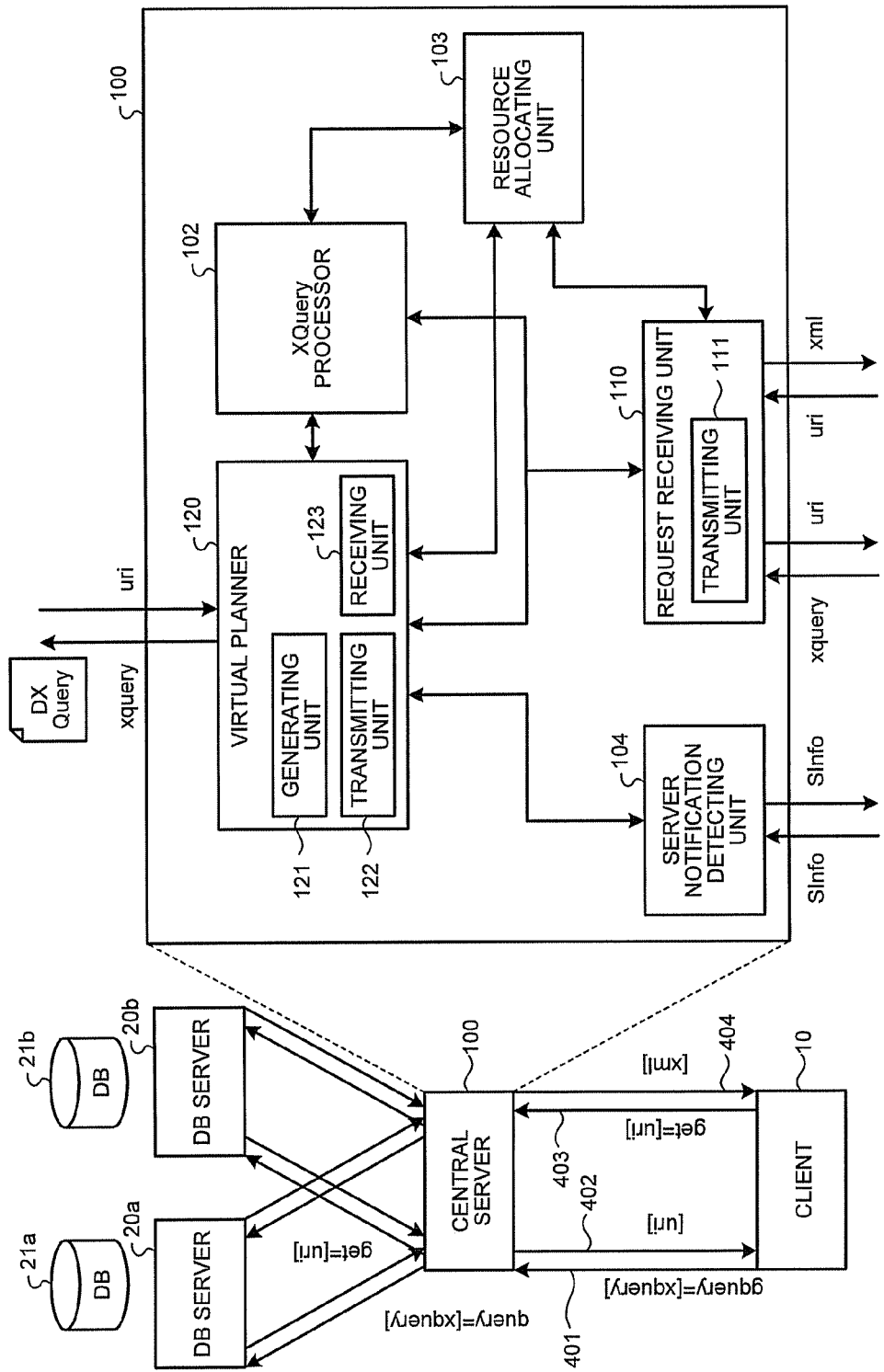
FIG. 4 is a block diagram of an exemplary configuration of a central server according to a first embodiment.

FIG. 4 is a block diagram of an exemplary configuration of the central server 100 according to the first embodiment. The central server 100 includes a request receiving unit 110 (a first receiving unit, a second receiving unit), a virtual planner 120, an XQuery processor 102 (an executing unit), a resource allocating unit 103 (an allocating unit), and a server notification detecting unit 104 (a detecting unit).

The request receiving unit 110 receives a request from the client 10 or other servers (e.g., the DB server 20a, 20b, and the like). For example, the request receiving unit 110 receives an XQuery processing request such as a query or a gquery or a resource processing request such as a get or a put and calls a necessary process. The request receiving unit 110 includes a transmitting unit 111 (a second transmitting unit, a third transmitting unit) that transmits a response to the request.

As illustrated on the left-hand side of FIG. 4, the request receiving unit 110 receives, for example, a data search request 401 from the client 10. The transmitting unit 111 returns a uri 402 of the resource for storing therein a result XML, to the client 10 that transmitted the search request 401. Further, the request receiving unit 110 receives, from the client 10, an obtainment request 403 for the result XML to be stored in the resource specified by the uri. The transmitting unit 111 returns a result XML 404 to the client 10 that transmitted the obtainment request 403.

The virtual planner 120 performs a planning process for the distributed XQuery processing. The virtual planner 120 includes a generating unit 121 (a first generating unit), a transmitting unit 122 (a first transmitting unit), and a receiving unit 123.

When the request receiving unit 110 receives a distributed gquery requesting an execution of the distributed XQuery processing, the generating unit 121 generates a DXQuery (a distributed search request) requesting the set of DB servers 20 to conduct a data search and a GXQuery (an integration request) to integrate search results of the DXQuery, from the XQuery specified by the received search request (gquery).

The transmitting unit 122 transmits the search request with the DXQuery to the DB servers 20. The receiving unit 123 receives the search results of the DXQuery from the DB servers 20.

The XQuery processor 102 executes the XQuery.

The resource allocating unit 103 manages the resources while using the uri's as keys. Because XML data is exchanged in XQuery, the resource allocating unit 103 allocates a resource uri to each piece of XML data for the purpose of controlling the data exchange. The resource allocating unit 103 has a technical feature of reserving an area for storing therein a resource, a technical feature of returning a uri expressing the URI of the reserved area, a technical feature of assigning XML data to the resource uri, and a technical feature of obtaining the XML data stored in the area identified by the uri.

The server notification detecting unit 104 causes server information (SInfo) to be exchanged among the servers by using a broadcast or the like and detects the servers connected to the network 30. The virtual planner 120 transmits the DXQuery to the DB servers 20 detected in this manner. Another arrangement is acceptable in which the server notification detecting unit 104 is not provided, but the virtual planner 120 accesses the DB servers 20 specified in advance.

Figure 5:
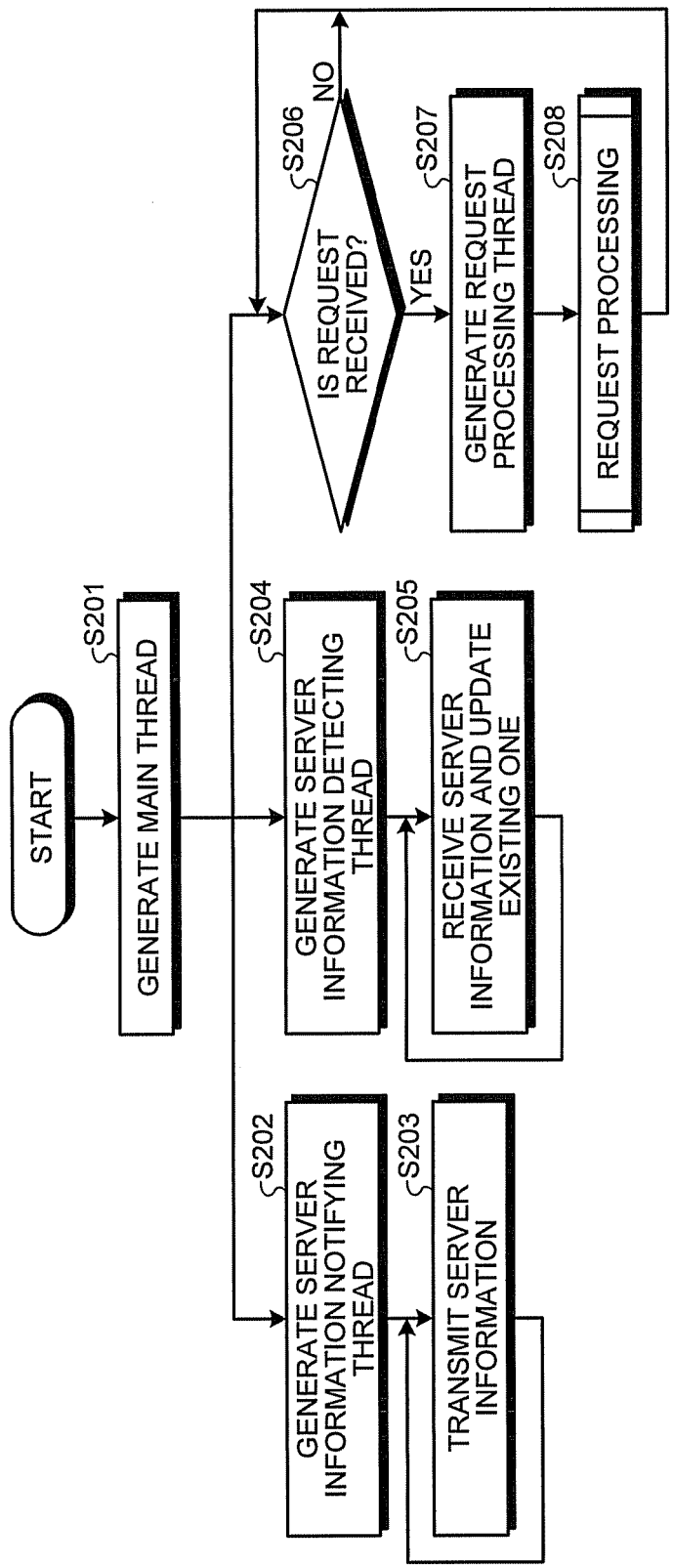
FIG. 5 is a flowchart of an overall flow in a searching process according to the first embodiment.

Next, a searching process performed by the central server 100 according to the first embodiment configured as described above will be explained, with reference to FIG. 5. FIG. 5 is a flowchart of an overall flow in the searching process according to the first embodiment.

First, when the central server 100 is started up, a main thread is generated (step S201). The following processes at steps S202 through S208 are the processes to be executed in the main thread.

In the main thread, two server notification detecting threads (i.e., a server information notifying thread and a server information detecting thread) and a request processing thread generated for each request are generated (steps S202, S204, and S207).

In the server information notifying thread, the server notification detecting unit 104 regularly transmits server information of the central server 100 to the other apparatuses such as the DB servers 20 that are connected to the network 30, by using, for example, a broadcast (step S203). This process is repeated until the server information notifying thread ends.

In the server information detecting thread, the server notification detecting unit 104 receives server information from the other apparatuses such as the DB servers 20 that are connected to the network 30 and updates existing server information (step S205). This process is repeated until the server information detecting thread ends.

The request processing thread is generated after an accepting process at a socket has been completed. During the accepting process, a connection is established after receiving a request indicating that a connection is waited for, so that a new socket is generated.

By using the generated socket, the request receiving unit 110 judges whether a request such as an XQuery processing request (query, gquery) or a resource processing request (get, put) is received (step S206). If no request is received (step S206: No), the process is repeated until a request is received.

If a request is received (step S206: Yes), the request receiving unit 110 generates the request processing thread (step S207). In the request processing thread, request processing to process the received request is executed (step S208).

During the request processing, a syntax analysis is performed on a received HTTP message, i.e., a GET message in the present example. The HTTP message is a message that is transmitted as a request from the client 10 to the central server 100 and is returned as a response from the central server 100 to the client 10.

The structure of the HTTP message is configured so as to include a "message header" and a "message body" arranged in a plurality of lines, and the "message header" and the "message body" are separated from each other by a blank line (Carriage Return [CR]+Line Feed [LF]). The message header contains the contents of the request or the response that should be processed by the central server 100 or the client 10. The message body contains the data itself that should be transferred.

The GET method is the only method defined by HTTP/0.9 and is used most often in HTTP. A server compliant with HTTP/1.1 needs to support the GET method.

FIG. 6 is a drawing explaining the request processing to perform a syntax analysis on a GET message and to sort processes.

The request receiving unit 110 extracts the method from the message and causes conditional branching according to the type of the method extracted (i.e., the message type).

(1) If the Method is a gquery Method:

Because distributed XQuery processing is requested, the virtual planner 120 is called.

(2) If the Method is a Query Method:

Because XQuery processing is requested, the XQuery is executed by the XQuery processor 102.

(3) If the Method is a Post Method:

A resource is generated by the resource allocating unit 103, and the uri of the generated resource is returned.

(4) If the Method is a Get Method:

The data corresponding to the resource specified by the uri is obtained.

(5) If the Method is a Put Method:

Data is assigned to the resource specified by the uri.

(6) If the Method is a Merge Method:

Data is merged, so that the merged data is assigned to the specified resource.

Figure 7:
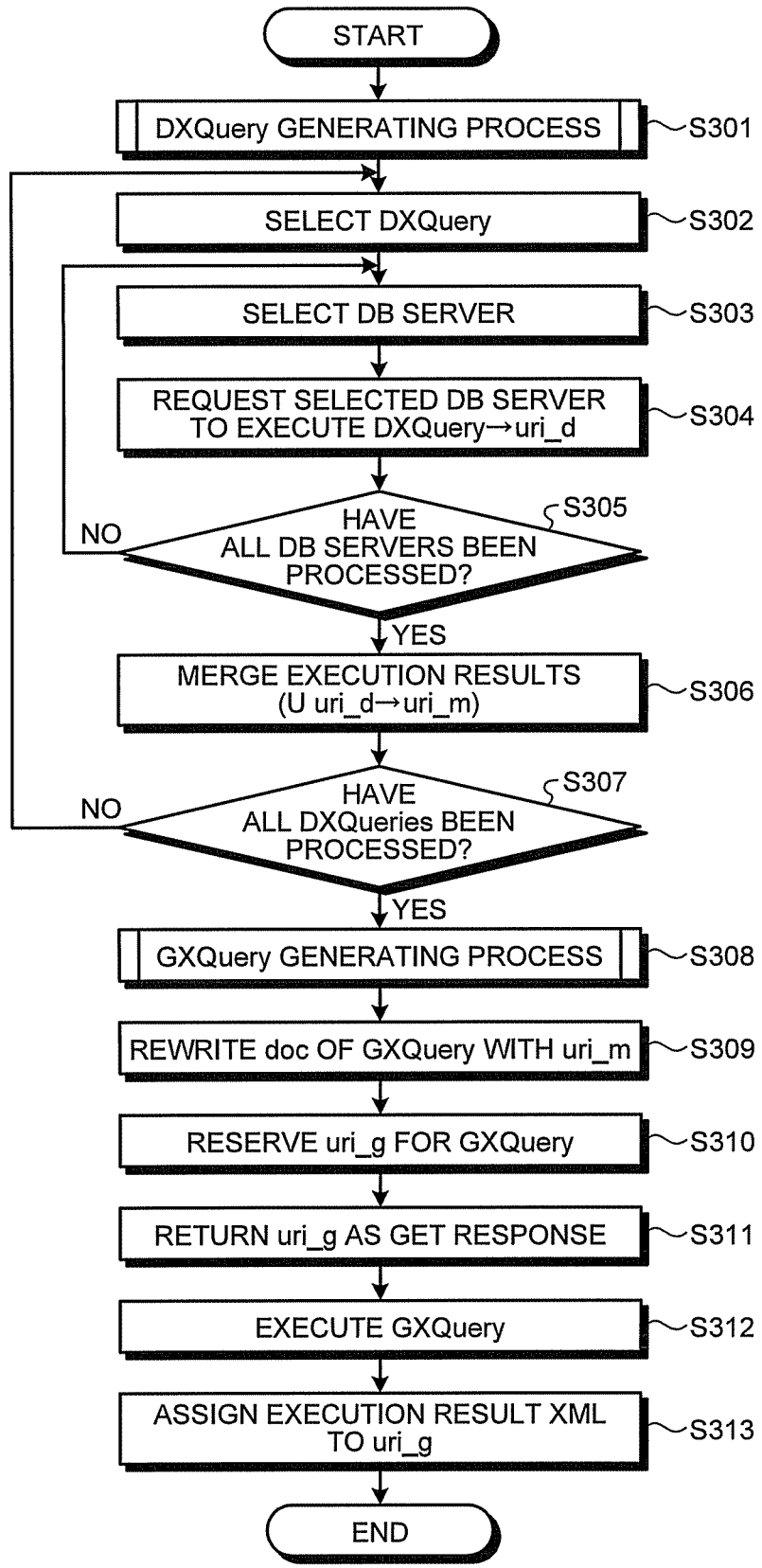
FIG. 7 is a flowchart of an example of distributed XQuery processing executed by a virtual planner.

FIG. 7 is a flowchart of an example of the distributed XQuery processing executed by the virtual planner 120. During the distributed XQuery processing, two types of XQueries as shown below are generated based on the input XQuery. A plurality of DXQueries are generated so that a DXQuery is generated for each of the DB servers 20. Normally, one GXQuery is generated.

(1) DXQuery: an XQuery for accessing the XML data stored in each of the DB servers 20

(2) GXQuery: an XQuery for integrating the XML data output by the DXQuery

First, the generating unit 121 included in the virtual planner 120 performs a DXQuery generating process to generate the plurality of DXQueries by analyzing the input XQuery (step S301). The details of the DXQuery generating process will be explained later.

The virtual planner 120 selects one of the generated DXQueries (step S302). The virtual planner 120 selects one of the plurality of DB servers 20 (step S303). The transmitting unit 122 included in the virtual planner 120 transmits an execution request to request an execution of the selected DXQuery to the selected DB server 20 (step S304). The DB server 20 to which the execution request was transmitted transmits the URI (i.e., uri_d) of the resource for storing therein an execution result (result XML) of the DXQuery, to the central server 100. Accordingly, the virtual planner 120 obtains uri_d, which is the URI of the resource for storing therein the result XML.

Subsequently, the virtual planner 120 judges whether an execution request has been transmitted to each of all the DB servers 20 (step S305). If the judgment result is in the negative (step S305: No), one of the unprocessed DB servers 20 is selected, so that the process is repeated thereon (step S303).

If an execution request has been transmitted to each of all the DB servers 20 (step S305: Yes), the virtual planner 120 requests the server of its own (i.e., the central server 100) to execute a merge method to merge the pieces of data obtained from the DB servers 20 and stored in the plurality of resources uri_d (step S306). When the request receiving unit 110 included in the central server 100 receives a message requesting the merge method, the request receiving unit 110 first returns the URI (uri_m) of the resource for storing therein the merged result (the result XML), to the virtual planner 120. Accordingly, the virtual planner 120 obtains the uri_m, which is the URI of the resource for storing therein the result XML.

After that, the virtual planner 120 judges whether all the DXQueries have been processed (step S307). If the judgment result is in the negative (step S307: No), one of the unprocessed DXQueries is selected, so that the process is repeated thereon (step S302).

If all the DXQueries have been processed (step S307: Yes), the generating unit 121 included in the virtual planner 120 performs a GXQuery generating process to generate a GXQuery that outputs a result XML satisfying the input XQuery (step S308). The details of the GXQuery generating process will be explained later.

Subsequently, the virtual planner 120 rewrites a doc( ) function of the GXQuery with the uri_m (step S309). The resource allocating unit 103 reserves a resource uri_g for storing therein an execution result of the GXQuery (step S310). The virtual planner 120 returns the uri_g to the client, as a GET response (step S311).

The XQuery processor 102 executes the GXQuery (step S312). The XQuery processor 102 assigns the result XML, which is an execution result of the GXQuery, to the resource uri_g (step S313).

As explained later, the client 10 transmits a get method specifying the uri_g to the central server 100. When having received an execution request to execute the get method, the request receiving unit 110 generates a request processing thread so as to wait until the result XML is assigned to the resource uri_g (step S207 in FIG. 5). When the result XML is assigned to the resource uri_g at step S313, the result XML is returned to the client 10 as a GET response, in this request processing thread.

Figure 8:
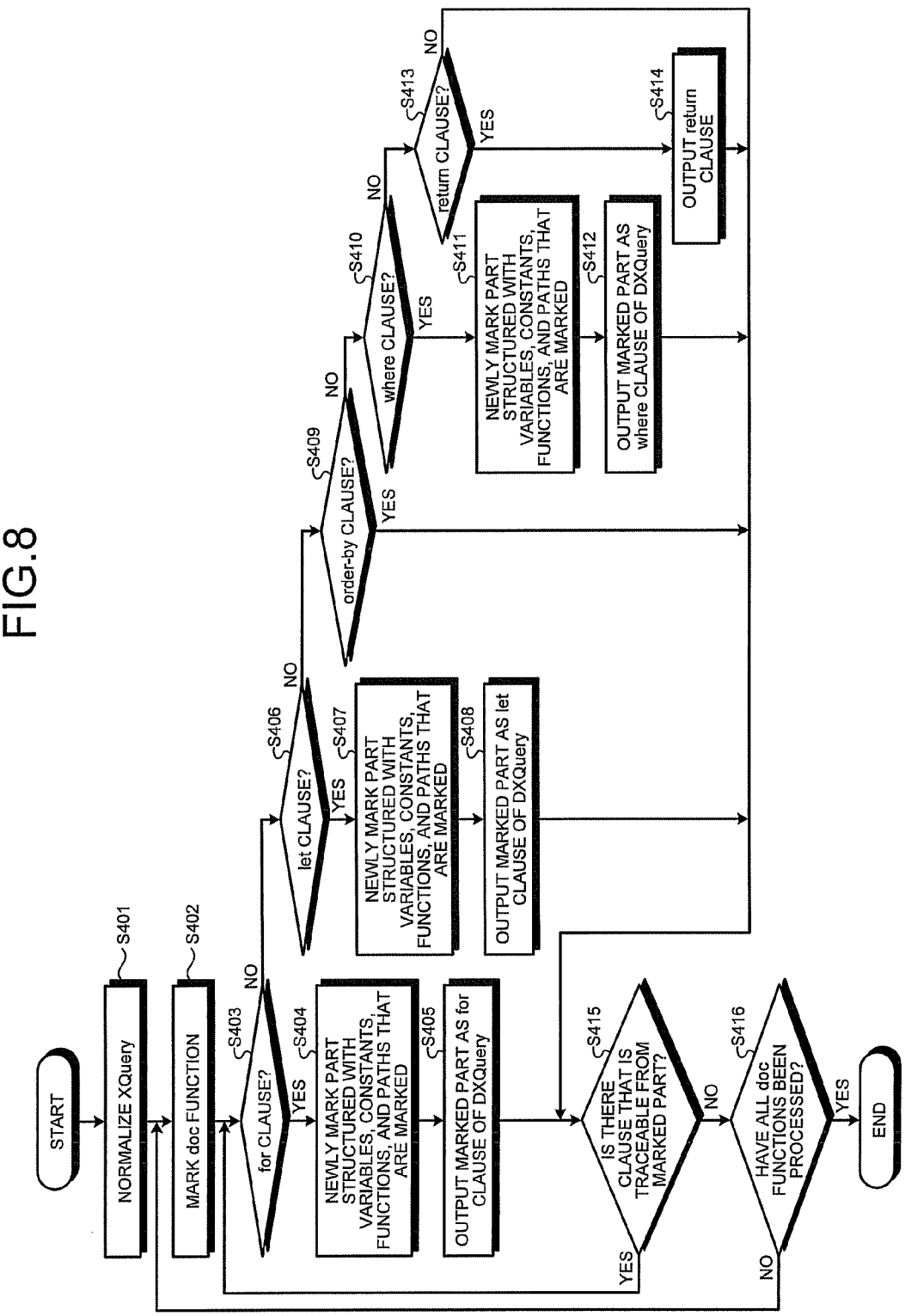
FIG. 8 is a flowchart of an example of a DXQuery generating process.

Next, the details of the DXQuery generating process at step S301 will be explained. FIG. 8 is a flowchart of an example of the DXQuery generating process. During the DXQuery generating process, a main process is to traverse nodes from a doc( ) function, while considering the XQuery as a tree, in the same manner as with XQueryX. XQueryX is a specification that makes it possible to describe an XQuery expression by using an XML structure.

Rules for the traversing process are as follows:
(1) Trace the path expressions under the doc( ) function.
(2) Trace a comparison expression between the path expressions under identical doc( ) functions.

Rules for returned values are as follows:
(1) The returned value is returned after converted into XML data in a format (hereinafter, "REC format") enclosed by <rec> as shown below:
<rec><col?> . . . </col?></rec>
(2) <col?> is used for separating values of variables.

First, the generating unit 121 normalizes the input XQuery (step S401). During the normalizing process, the generating unit 121 performs, for example, a process to expand a predicate clause into a FLWOR structure and a process to arrange a return clause to be enclosed in the form of a let clause that includes a variable and tags.

After that, the generating unit 121 marks (detects) doc( ) functions appearing in the input XQuery (step S402). Hereinafter, the loop in the process at steps S403 through S415 is repeated for each of the appearing doc( ) functions. In other words, a DXQuery is generated for each of the doc( ) functions. A basic algorithm is to find, while marking it, a range that is traceable from the doc( ) function via paths or constants.

The generating unit 121 sorts the processes by judging which clause in the FLWOR structure contains the marked part (the doc( ) function). In other words, the generating unit 121 judges whether the marked part is contained in a for clause (step S403). If the marked part is contained in a for clause (step S403: Yes), the generating unit 121 newly marks a part structured with the variables, the constants, the functions and the paths that are marked (step S404). In other words, the generating unit 121 traces the paths while using the marked doc( ) function as a starting point and newly marks the traced part. The generating unit 121 then outputs the marked part as a for clause of the DXQuery (step S405).

If the marked part is not contained in a for clause (step S403: No), the generating unit 121 judges whether the marked part is contained in a let clause (step S406). If the marked part is contained in a let clause (step S406: Yes), the generating unit 121 newly marks a part structured with the variables, the constants, the functions, and the paths that are marked (step S407). In other words, the generating unit 121 traces the paths while using the marked doc( ) function as a starting point and newly marks the traced part. The generating unit 121 then outputs the marked part as a let clause of the DXQuery (step S408).

If the marked part is not contained in a let clause (step S406: No), the generating unit 121 judges whether the marked part is contained in an order-by clause (step S409). If the marked part is contained in an order-by clause (step S409: Yes), the process proceeds to step S415.

If the marked part is not contained in an order-by clause (step S409: No), the generating unit 121 judges whether the marked part is contained in a where clause (step S410). If the marked part is contained in a where clause (step S410: Yes), the generating unit 121 newly marks a part structured with the variables, the constants, the functions and the paths that are marked (step S411). The generating unit 121 then outputs the marked part as a where clause of the DXQuery (step S412).

If the marked part is not contained in a where clause (step S410: No), the generating unit 121 judges whether the marked part is contained in a return clause (step S413). If the marked part is contained in a return clause (step S413: Yes), the generating unit 121 outputs a return clause of the DXQuery while using a format "return<rec>{X}</rec>" (step S414). A clause using the formats shown in (1) and (2) below is output in "X" above.

```
(1):
<col0>
    {$variable}
</col0>
(2):
for $dummy variable in $variable
return
<col1>
    {dummy variable}
</col1>
```

If it is determined at step S413 that the marked part is not contained in a return clause (step S413: No), the process proceeds to step S415. At step S415, the generating unit 121 judges whether there is a clause that is traceable from the marked part, i.e., whether there is another clause that contains the variables, the constants, the functions, the path, and the like that are contained in the marked part (step S415). If there is such a clause (step S415: Yes), the processes at step S403 and thereafter are repeated on the clause. If there is no such clause (step S415: No), the process proceeds to step S416.

At step S416, the generating unit 121 judges whether all the doc( ) functions appearing in the input XQuery have been processed (step S416). If the judgment result is in the negative (step S416: No), the doc( ) function appearing next is marked, and the process is repeated (step S402). If all the doc( )functions have been processed (step S416: Yes), the DXQuery generating process ends.

Figure 9:
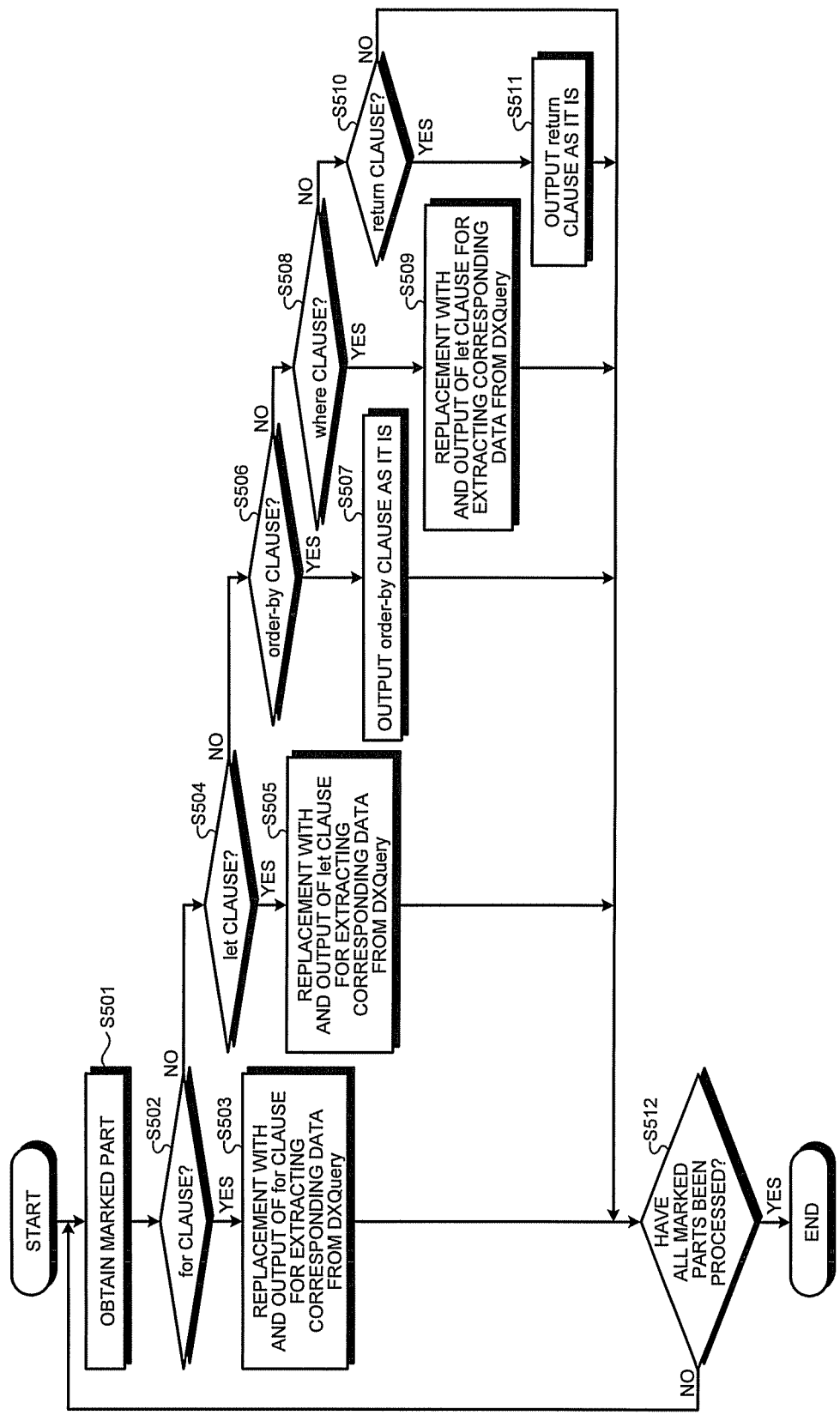
FIG. 9 is a flowchart of an example of a GXQuery generating process.

Next, the details of the GXQuery generating process at step S308 will be explained. FIG. 9 is a flowchart of an example of the GXQuery generating process. During the GXQuery generating process, the process is performed by using the XQuery marked in the DXQuery generating process. The GXQuery generating process is to, mainly with respect to a marked part, calculate a for clause or a let clause for extracting corresponding data from a previously-generated DXQuery and to replace the marked part with the calculated clause.

First, the generating unit 121 obtains a part marked in the input XQuery (hereinafter, the "marked part") (step S501). The generating unit 121 judges whether the marked part contains a for clause (step S502). If the marked part contains a for clause (step S502: Yes), the generating unit 121 replaces the marked part with a for clause for extracting the corresponding data from the DXQuery and outputs the for clause (step S503). The generating unit 121 outputs, for example, a for clause in a format as shown in (1) below.

```
(1):
for $dummy variable in
    doc([uri])/root/rec
for $variable in
    $dummy variable/col/*
```

If the marked part contains no for clause (step S502: No), the generating unit 121 judges whether the marked part contains a let clause (step S504). If the marked part contains a let clause (step S504: Yes), the generating unit 121 replaces the marked part with a let clause for extracting the corresponding data from the DXQuery and outputs the let clause (step S505). The generating unit 121 outputs, for example, a let clause in a format as shown in (2) below.

```
(2):
let $variable :=
    for $dummy variable 1 in
        doc([uri])/root/rec
    for $dummy variable 2 in
        $dummy variable 1/col/*
    return $dummy variable 2
```

If the marked part contains no let clause (step S504: No), the generating unit 121 judges whether the marked part contains an order-by clause (step S506). If the marked part contains an order-by clause (step S506: Yes), the generating unit 121 outputs the order-by clause as it is (step S507).

If the marked part contains no order-by clause (step S506: No), the generating unit 121 judges whether the marked part contains a where clause (step S508). If the marked part contains a where clause (step S508: Yes), the generating unit 121 replaces the marked part with a let clause for extracting the corresponding data from the DXQuery and outputs the let clause (step S509). The generating unit 121 outputs, for example, a let clause in a format as shown in (3) below.

```
(3):
let $dummy variable := in
    $variable/col/*
``` where dummy variable comparison expression

If the marked part contains no where clause (step S508: No), the generating unit 121 judges whether the marked part contains a return clause (step S510). If the marked part contains a return clause (step S510: Yes), the generating unit 121 outputs the return clause as it is (step S511).

After any of the processes at steps S503, S505, S507, S509, and S511 is performed or if it is determined at step S510 that the marked part contains no return clause (step S510: No), the generating unit 121 judges whether all the marked parts have been processed (step S512). If the judgment result is in the negative (step S512: No), one of the unprocessed marked parts is obtained so that the process is repeated thereon (step S501). If all the marked parts have been processed (step S512: Yes), the GXQuery generating process ends.

Figure 10:
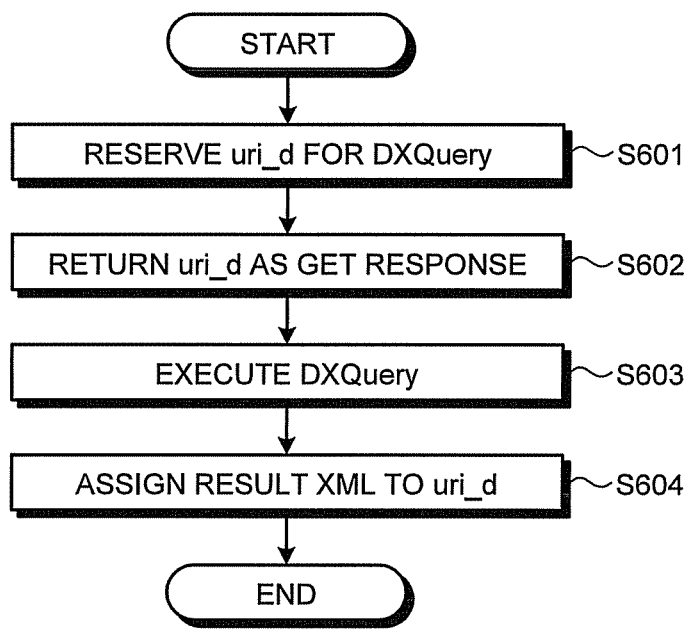
FIG. 10 is a flowchart of an example of XQuery processing.

Next, the XQuery processing performed by any of the DB servers 20 in response to a DXQuery execution request from the virtual planner 120 will be explained. It should be noted that the XQuery processing performed by the XQuery processor 102 when the client 10 requests XQuery processing (query) instead of distributed XQuery processing (gquery) is also performed in the same manner. FIG. 10 is a flowchart of an example of the XQuery processing.

The DB server 20 reserves a resource uri_d for the requested DXQuery (step S601). The DB server 20 returns the uri_d to the central server 100 as a GET response (step S602). The DB server 20 executes the DXQuery on the XQuery processor (step S603). The DB server 20 assigns the result XML, which is an execution result of the DXQuery, to the resource uri_d (step S604). When the XQuery processor 102 executes the XQuery processing, a request processing thread is generated so as to wait until the result XML is assigned to the resource uri_d.

Figure 11:
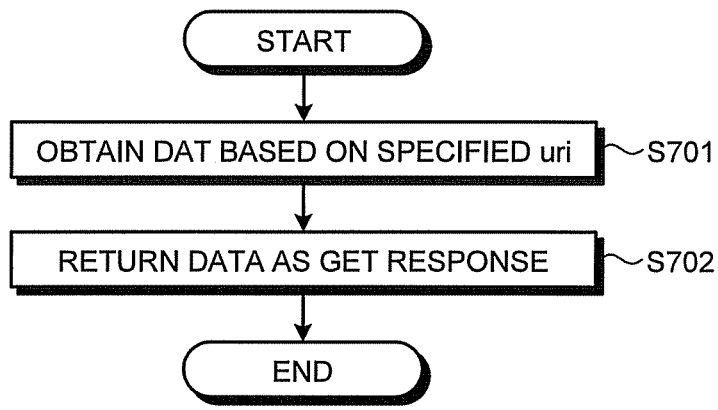
FIG. 11 is a flowchart of an example of an obtaining process.

Next, an obtaining process to obtain the data corresponding to a resource by a get method will be explained. FIG. 11 is a flowchart of an example of the obtaining process.

The request receiving unit 110 obtains the data corresponding to the resource uri specified by the get method (step S701). If it is not possible to obtain the data, a request processing thread is generated so as to wait until the data is assigned, and the process enters a waiting state to wait for the event of the assigning. When the data is assigned to the resource uri, the request receiving unit 110 returns the data to the request origin of the get method, as a GET response (step S702).

Figure 12:
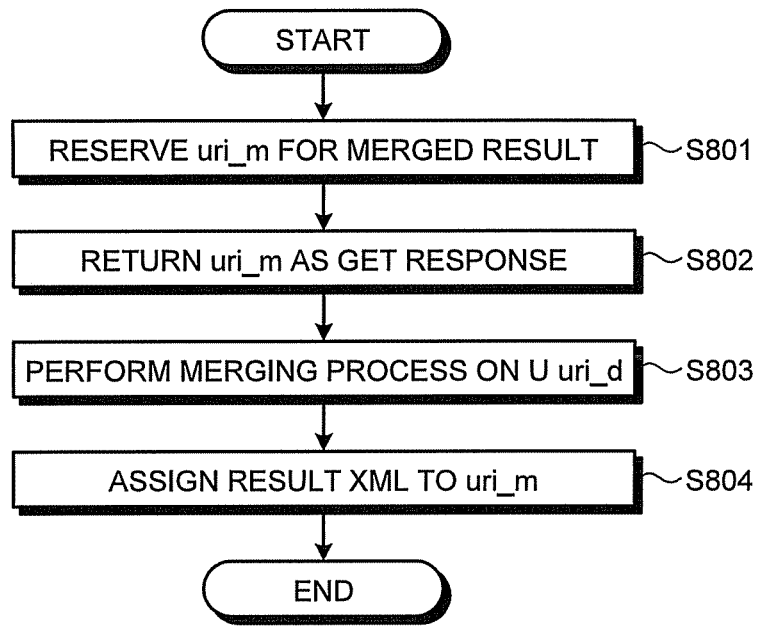
FIG. 12 is a flowchart of an example of a merging process.

Next, a merging process to merge pieces of resource data by a merge method will be explained. FIG. 12 is a flowchart of an example of the merging process.

The request receiving unit 110 reserves a resource uri_m for storing therein a result of the merging process (step S801). The request receiving unit 110 returns the uri_m, which is the URI of the reserved resource, to the request origin, as a GET response (step S802). The request receiving unit 110 performs a merging process on the resources included in the set of resources on which a merging process was requested by the merge method (step S803).

The notation "∪ uri_d" in FIG. 12 denotes the set of resources uri_d on which a merging process was requested. In this situation, the "merging process" means to join the pieces of resource data in series.

The request receiving unit 110 assigns the result XML, which is the XML data obtained as a result of the merging process, to the uri_m (step S804). When an assignment of a result XML to the uri_m is waited for in another thread or the like, a request processing thread is generated so as to wait until the result XML is assigned.

Figure 13:
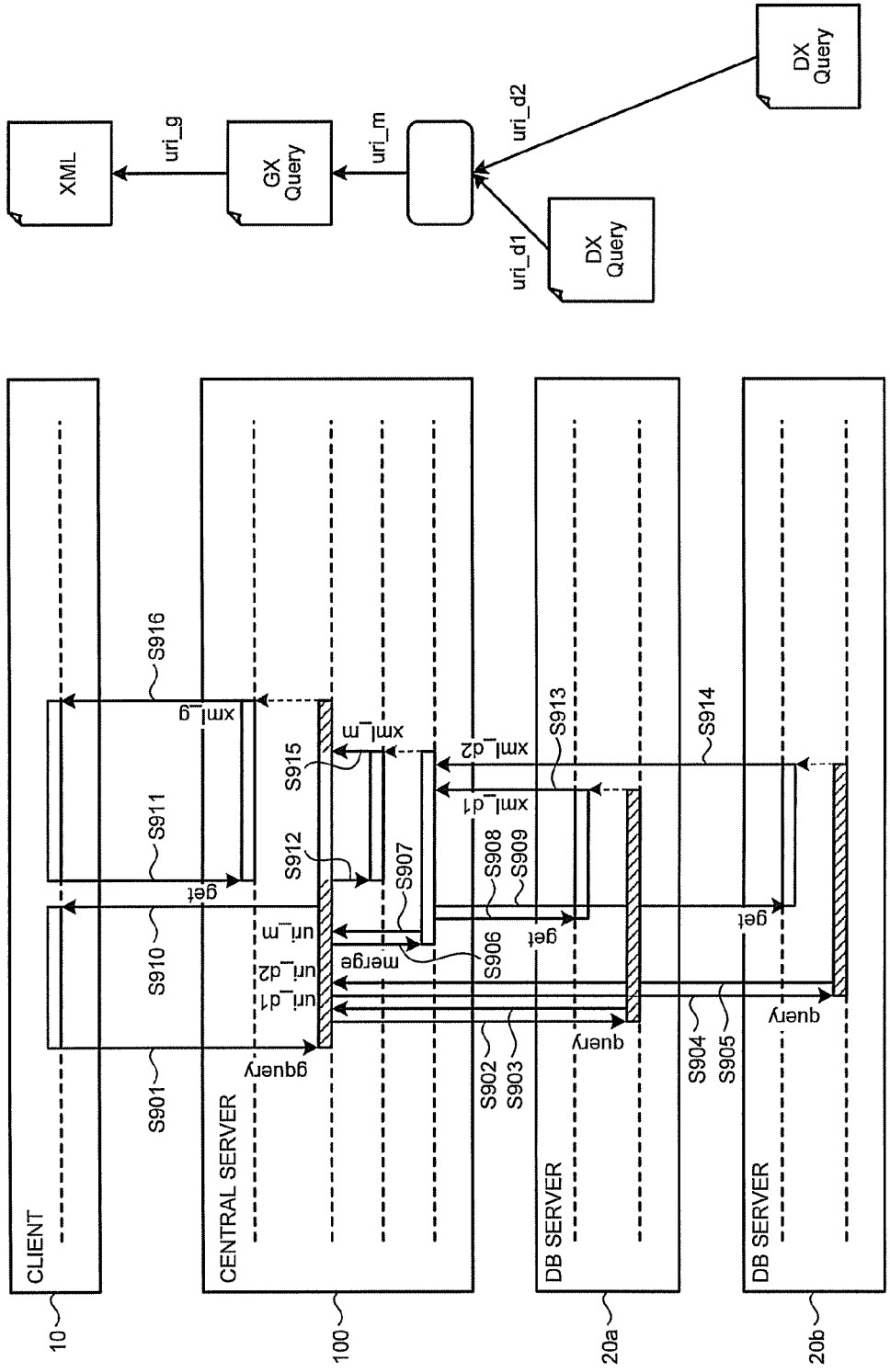
FIG. 13 is a sequence chart expressing in a time sequence how a client and a plurality of servers interact with one another.

FIG. 13 is a sequence chart expressing in a time sequence how the client 10 and the plurality of servers (the central server 100, the DB server 20a, and the DB server 20b) interact with one another. In FIG. 13, it is assumed that the lapse of time is expressed from left to right.

First, by a gquery method, the client 10 requests the central server 100 to perform distributed XQuery processing (step S901).

By a query method, the central server 100 requests the DB server 20a to perform XQuery processing (step S902). The query method used in this situation has the DXQuery generated by the generating unit 121 as an argument. The central server 100 obtains uri_d1 indicating the URI of the resource for the result XML resulting from the query method, from the DB server 20a (step S903).

By a query method, the central server 100 requests the DB server 20b to perform XQuery processing (step S904). The query method used in this situation has the DXQuery generated by the generating unit 121 as an argument. The central server 100 obtains uri_d2 indicating the URI of the resource for the result XML resulting from the query method, from the DB server 20b (step S905).

By a merge method, the central server 100 requests the server itself (i.e., the central server 100) to perform a merging process on the resource uri_d1 and the resource uri d2 (step S906). The central server 100 obtains the uri_m indicating the URI of the resource for the result XML resulting from the merge method, from the server itself (i.e., the central server 100) (step S907).

By a get method, the central server 100 requests the DB server 20a to obtain the result XML corresponding to the uri_d1 (step S908). By a get method, the central server 100 requests the DB server 20b to obtain the result XML corresponding to the uri_d2 (step S909).

The central server 100 returns the uri_g to the client 10, as a GET response to the gquery method (step S910).

By a get method, the client 10 requests the central server 100 to obtain the result XML corresponding to the uri_g (step S911).

By a get method, the central server 100 requests the server itself (i.e., the central server 100) to obtain the result XML corresponding to the uri_m obtained at step S907 (step S912).

When the result XML that represents the execution result of the query method requested by the central server 100 from the DB server 20a is generated, the DB server 20a assigns xml_d1, which is the result XML, to the resource uri_d1 (step S913).

Similarly, when the result XML that represents the execution result of the query method requested by the central server 100 from the DB server 20b is generated, the DB server 20b assigns xml_d2, which is the result XML, to the resource uri_d2 (step S914).

When the result XML that is a result of the merging process performed on the uri_d1 and the uri_d2 as requested from the server itself (i.e., the central server 100) by the merge method is generated, the central server 100 assigns xml_m, which is the result XML, to the resource uri_m (step S915).

When the result XML corresponding to the uri_g that was requested by the client 10 from the central server 100 by the get method is generated, the central server 100 assigns the result XML to the uri_g (step S916).

As shown in FIG. 13, in response to the query method requested, each of the DB servers 20 returns the response notifying the resource for storing therein the execution result, before the execution result is available (e.g., steps S903 and S905). In other words, each of the DB servers 20 needs to have a technical feature of returning, in response to the query method, the response notifying the resource for storing therein the execution result of the XQuery processing before the execution result is available, instead of returning a response notifying the execution result after the execution result becomes available. If each of the DB servers 20 did not have this technical feature, it would be acceptable to configure the central server 100 so as to include an alternative technical feature.

On the right-hand side of FIG. 13, a relationship among the XQueries, the resources, and the XML data processed in the sequence described above are shown. More specifically, each of the DB servers 20a and 20b executes the DXQuery, so that the execution results are stored into the resource uri_d1 and the resource uri_d2, respectively. Further, the resource uri_g for storing therein the execution result of the GXQuery in which the resource uri_m merging the resource uri_d1 and the resource uri_d2 is embedded is transmitted to the client 10. When the result XML that is the execution result of the GXQuery is obtained, the result XML is transmitted to the client 10.

Next, a specific example of a searching process will be explained. FIG. 14 shows an example of an XQuery being input from a client. The XQuery in FIG. 14 indicates that "all the rows containing "Kanagawa" in column 3 should be extracted".

FIG. 15 shows an example of data stored in a DB 21a shown in FIG. 2. As shown in FIG. 15, the DB 21a is an example of a business office database storing therein names of business offices (column 1), addresses (column 2), and prefectures (column 3). FIG. 15 depicts data corresponding to four rows (four business offices).

FIG. 16 shows an example of a DXQuery generated from the XQuery in FIG. 14. The basic structure is the same as the one in FIG. 14. The DXQuery in FIG. 16 indicates that "all the rows containing "Kanagawa" in column 3 should be extracted in a REC format".

FIG. 17 shows an example of the result XML that is an execution result of the DXQuery in FIG. 16. FIG. 17 depicts an example of the result XML (xml_d1) found in the search in the DB 21a shown in FIG. 15, as a result of the DXQuery.

FIG. 18 shows an example of a GXQuery generated from the XQuery in FIG. 14. The GXQuery in FIG. 18 is made up of the following two parts:

(1) A part for extracting each rec by reading the result XML of the DXQuery; and
(2) A part for extracting the value of col? of the rec As shown in FIGS. 16 and 18, the following is satisfied: "the GXQuery"+"the DXQuery"="the XQuery being input".

Next, the process of generating the DXQuery in FIG. 16 and the GXQuery in FIG. 18 from the XQuery in FIG. 14 will be further explained.

First, a doc( ) function "doc("database.XML")" is extracted from the XQuery in FIG. 14 (step S402 in FIG. 8).

As for a for clause, because the main body of the clause is marked by tracing "//row" from the doc( ) function, the part up to "$x" is marked.

As for a where clause, "$x" is already marked. "$x//column3" is also marked. "Kanagawa" is a constant. Accordingly, the entirety of the where clause is marked. As a result, a DXQuery as shown in FIG. 16 is generated.

After that, the GXQuery is generated. Because the for clause and the where clause are marked for the DXQuery, a for clause for extracting the corresponding data from the DXQuery is as shown in FIG. 18.

FIG. 19 shows an example of the result XML that is an execution result of the GXQuery in FIG. 18. As shown in FIG. 19, the result XML that is an execution result of the GXQuery is stored in the resource xml_g.

Next, another example of an XQuery that is more complicated than the one shown in FIG. 14 will be further explained. FIG. 20 shows another example of an XQuery being input from a client. The XQuery in FIG. 20 indicates that "rows should be counted with respect to column 3 of the rows". For example, with reference to the data shown in FIG. 15, the XQuery indicates that "the business offices should be counted for each of the prefectures".

Next, a number of built-in functions will be explained.
(1) distinct-values: extract element sequences that are mutually different in terms of the values thereof, out of an input sequence
(2) count: return the number of elements in an input sequence FIG. 21 explains a concept of a DXQuery generating process performed on the example shown in FIG. 20.

With the following rules for traversing, two DXQueries (DXQuery 1 and DXQuery 2) will be generated:
(1) Trace the path expressions under the doc( ) function.
(2) Trace a comparison expression between the path expressions under identical doc( ) functions.

FIG. 22 shows an example of the DXQuery 1. FIG. 23 shows an example of the result XML that is an execution result of the DXQuery 1 shown in FIG. 22. FIG. 24 shows an example of the DXQuery 2. FIG. 25 shows an example of the result XML that is an execution result of the DXQuery 2 shown in FIG. 24. FIG. 26 shows an example of a GXQuery generated from the XQuery in FIG. 20.

As shown in FIGS. 22, 24, and 26, the following is satisfied: "the GXQuery"+"the DXQuery (the DXQuery 1, the DXQuery 2)"="the XQuery being input". FIG. 27 shows an example of the result XML that is an execution result of the GXQuery in FIG. 26. As shown in FIG. 27, a result of "counting the business offices for each of the prefectures" is obtained as the result XML.

As explained above, the searching apparatus according to the first embodiment is able to realize the distributed XQuery processing without using XRPC. Consequently, the following advantageous effects are achieved:

(1) XQuery transparency: The user does not need to explicitly describe a special language extension in an XQuery.
(2) Integration of mutually-different types: It is possible to structure a virtual XML database by connecting a different type of database such as an RDBMS or a Web service to an ordinary network or in an ordinary communication protocol. By configuring only a few definitions, a non-XML-DBMS web service such as a map information service or a weather information service that does not support XQuery is also able to become a constituent element of a virtual XML database.
(3) A high speed: Even if an XQuery contains a for loop, the message does not travel in the network as many times as the number of loops. It is possible to process the execution of a function in parallel in a plurality of servers, without performing sequential processing like in the example of RPC. When a join calculation is performed on an ordinary distributed database, it is possible to easily apply a semi-join method thereto, as a method for minimizing the communication load.

A searching apparatus according to a second embodiment converts (generalizes) a DXQuery so as to satisfy the searching capability (query processing capability) of the DB server and generates a search result of the pre-conversion DXQuery from a search result of the converted DXQuery. With this arrangement, it is possible to realize a search with a high level of precision, according to the query processing capabilities of the DB servers.

FIG. 28 is a block diagram of an exemplary configuration of a central server 200 according to the second embodiment. The central server 200 includes the request receiving unit 110, a virtual planner 220, the XQuery processor 102, the resource allocating unit 103, the server notification detecting unit 104, and a generalizing processor 230.

The second embodiment is different from the first embodiment because of technical features of the virtual planner 220 and because the generalizing processor 230 is additionally provided. The other configurations and technical features are the same as those shown in FIG. 4, which is a block diagram of the central server 100 according to the first embodiment. The same configurations and technical features will be referred to by using the same reference characters, and the explanation thereof will be omitted.

The virtual planner 220 is different from the virtual planner 120 according to the first embodiment in that the virtual planner 220 requests the generalizing processor 230 to generalize a generated DXQuery and causes a transmitting unit 222 to transmit the generalized DXQuery (hereinafter, "DXQuery'") to the DB servers 20.

The generalizing processor 230 includes a converting unit 231 and a generating unit 232 (a second generating unit). The converting unit 231 converts a DXQuery generated by the generating unit 121 included in the virtual planner 220 into a DXQuery' generalized according to the query processing capability of the DB server 20. The generating unit 232 generates a VXQuery (a generation request), which is an XQuery for verifying a search result of the DXQuery'. The VXQuery is an XQuery for generating such a search result that would be obtained if the pre-conversion DXQuery is used, by verifying an insufficient part of the query processing capability of the DB server 20 exhibited in the search result of the DXQuery' and supplementing the insufficient part.

Figure 29:
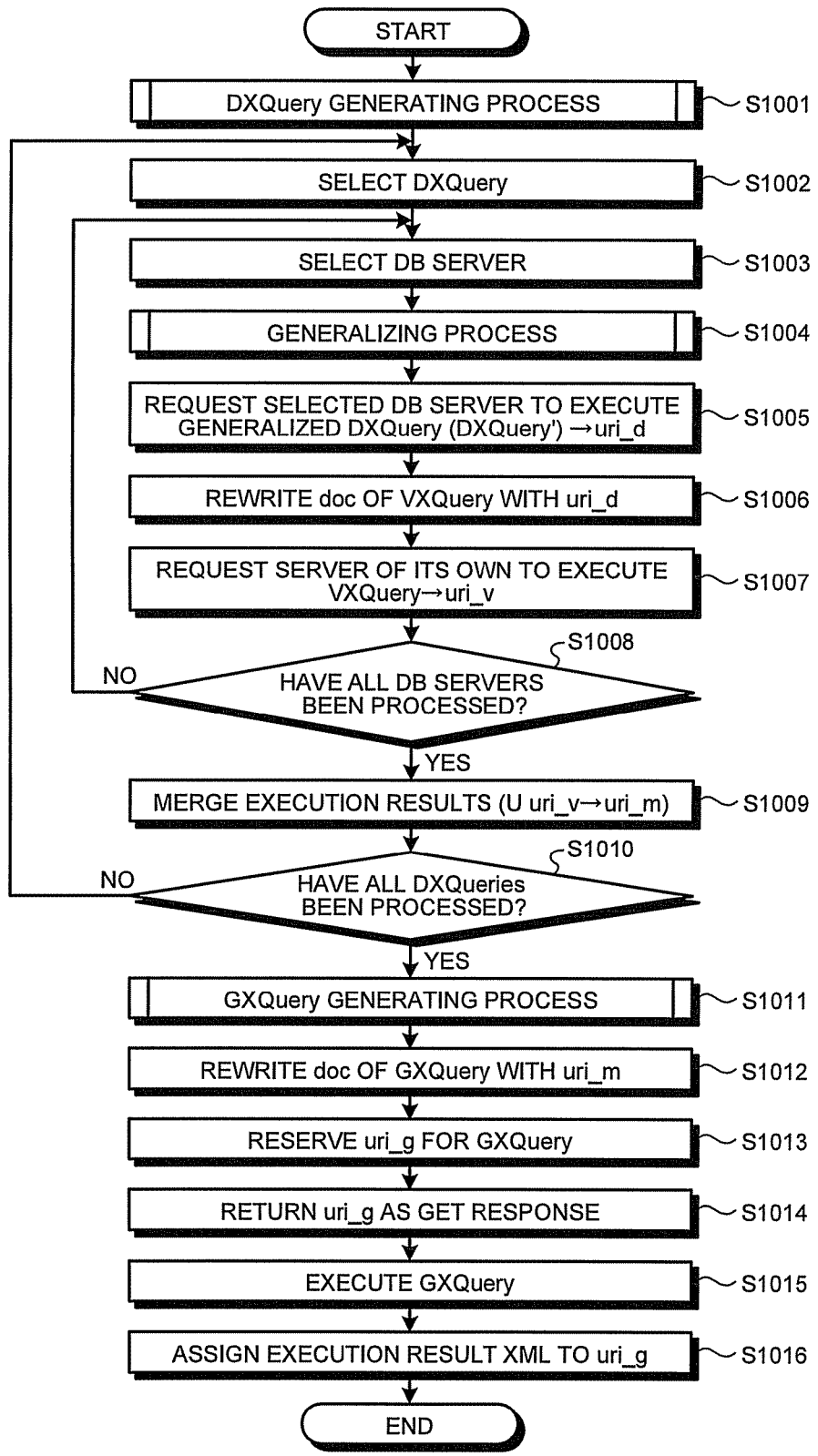
FIG. 29 is a flowchart of an example of distributed XQuery processing executed by a virtual planner and a generalizing processor.

FIG. 29 is a flowchart of an example of distributed XQuery processing executed by the virtual planner 220 and the generalizing processor 230. In the distributed XQuery processing according to the second embodiment, the DXQuery' obtained by generalizing the DXQuery, the VXQuery, and a GXQuery to integrate results of the VXQuery are generated.

The processes at steps S1001 through S1003 are the same as the processes at steps S301 through S303 performed by the central server 100 according to the first embodiment. Thus, the explanation thereof will be omitted.

At step S1004, a generalizing process to generate the DXQuery' and the VXQuery from the DXQuery is performed. The details of the generalizing process will be explained later.

After that, the transmitting unit 222 included in the virtual planner 220 transmits an execution request to execute the generalized DXQuery' to a selected one of the DB servers 20 (step S1005). The DB server 20 to which the execution request was transmitted transmits the URI (the uri_d) of the resource for storing therein an execution result (the result XML) of the DXQuery', to the central server 200. Thus, the virtual planner 220 obtains the uri_d, which is the URI of the resource for storing therein the result XML.

Subsequently, the virtual planner 220 rewrites the doc( ) function of the VXQuery with the obtained uri_d (step S1006). The virtual planner 220 requests the server of its own (i.e., the central server 200) to execute the VXQuery by specifying a query method (step S1007) and obtains uri_v for storing therein the result XML of the VXQuery.

The process at step S1008 is the same as the process at step S305 in FIG. 7, and the explanation thereof will be omitted. The process at step S1009 is different from the process at step S306 in FIG. 7 in that the resource uri_v is used instead of the resource uri_d. In other words, the virtual planner 220 requests the server of its own (i.e., the central server 200) to execute a merge method to merge the pieces of data respectively stored in the plurality of resources uri_v (step S1009).

The processes at steps S1010 through S1016 are the same as the processes at steps S307 through S313 performed by the central server 100 according to the first embodiment. Thus, the explanation thereof will be omitted.

Figures 30, 31:
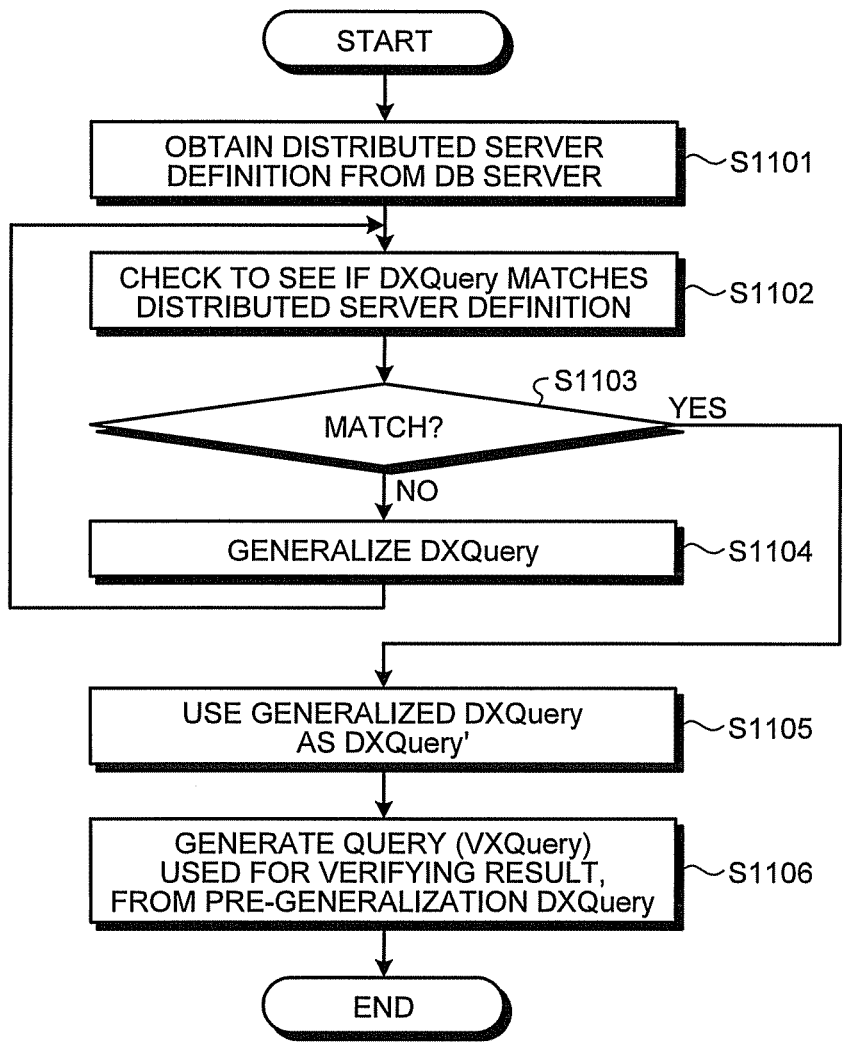
FIG. 30 is a flowchart of an example of a generalizing process.
FIG. 31 shows an example of a distributed server definition.

Next, the generating process at step S1004 will be explained. FIG. 30 is a flowchart of an example of the generalizing process.

First, the generalizing processor 230 obtains a distributed server definition from each of the DB servers 20 (step S1101). The distributed server definition is information expressing the query processing capability of the DB server. FIG. 31 shows an example of the distributed server definition. "SERVICE http://example.com/?key=%1" indicates that the server is capable of processing a parameter for a "key". "XQuery for $x in . . . " indicates that it is possible to replace the parameter for the "key" with "contains ($x, "% 1")".

Returning to the description of FIG. 30, the generalizing processor 230 checks to see if the selected DXQuery matches an XQuery pattern of the distributed server definition (step S1102). If the selected DXQuery does not match the XQuery pattern (step S1103: No), the converting unit 231 generalizes the DXQuery (step S1104), so that the process returns to step S1102 and the process is repeated.

To generalize the DXQuery, the converting unit 231 performs a process of, for example, (1) omitting a path, (2) expanding an OR condition, or (3) converting a tag name into "*" (converting the name of an element contained in the XML data).

If the DXQuery matches the XQuery pattern of the distributed server definition (step S1103: Yes), the converting unit 231 outputs the generalized DXQuery (or the selected DXQuery, if not generalized) as a DXQuery' (step S1105). Subsequently, the generating unit 232 generates a VXQuery from the original DXQuery (step S1106), and the generalizing process ends.

FIG. 32 shows an example of the DXQuery' being output in the generalizing process when the XQuery in FIG. 14 and the distributed server definition in FIG. 31 are input. In comparison with the DXQuery in FIG. 16, it is observed that the tag name "row" and the path "$x//column3" are omitted from the DXQuery' shown in FIG. 32. By repeatedly performing a generalizing operation on the DXQuery in this manner, the DXQuery' that matches the query processing capability of the DB server 20 is generated.

FIG. 33 shows an example of the VXQuery being output in the generalizing process when the XQuery in FIG. 14 and the distributed server definition in FIG. 31 are input.

Figure 34:
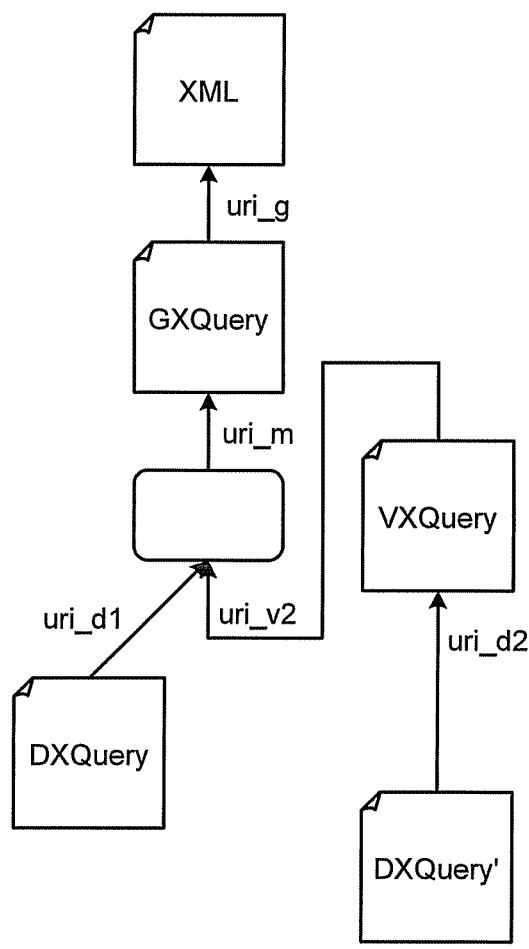
FIG. 34 is a drawing of an example of a relationship among XQueries, resources, and XML data that are processed in the second embodiment.

FIG. 34 is a drawing of an example of a relationship among XQueries, resources, and XML data that are processed in the second embodiment. FIG. 34 depicts an example in which a generalizing process has been performed only on the DXQuery to be transmitted to the DB server 20b. The DXQuery and the DXQuery' are executed by the DB server 20a and the DB server 20b, respectively, so that the execution results are stored in the resource uri_d1 and the resource uri_d2, respectively. The VXQuery is executed on the resource uri_d2, so that an execution result uri_v2 is output. The resource uri_g for storing therein an execution result of the GXQuery in which the resource uri_m merging the resource uri_d1 and the resource uri_v2 is embedded is transmitted to the client 10. When the result XML that is an execution result of the GXQuery is obtained, the result XML is transmitted to the client 10.

Next, the process of generating the DXQuery in FIG. 32 from the XQuery in FIG. 14 and the distributed server definition in FIG. 31 will be further explained.

The distributed server definition in FIG. 31 describes a declaration regarding the query processing capability of the DB server 20 where "in order for the DB server to obtain data, the DB server is able to conduct a search ("contains") only by using a keyword ("key")".

The generalizing processor 230 compares the XQuery in FIG. 14 with the distributed server definition in FIG. 31 and list up syntax differences (step S1102 in FIG. 30). For example, the generalizing processor 230 loads a syntax tree of the XQuery into a memory by combining tools for a lexical analysis and a syntax analysis such as Yacc&Lex, so as to compare the syntax trees in the two memories.

As a result, the generalizing processor 230 is able to detect that there is a difference between "doc( )//row" and "doc( )/*" and there is a difference between "$x//column3" and "$x". These two differences are related to the XQuery paths. Accordingly, the converting unit 231 applies a generalizing operation of "omitting a path" thereto. It is possible to realize the generalizing operation by using, for example, a rule-based system technique. In other words, the generalizing operation is expressed by using a rule constituted with two parts including an IF clause and a THEN clause such as "IF there is a difference in a path, THEN the path is omitted". By repeatedly applying a set of such rules until a stop condition is satisfied while using an inference engine, it is possible to realize the generalizing operation. The stop condition in this situation is that there is no longer any difference between the DXQuery and the distributed server definition.

For example, with regard to the XQuery in FIG. 14, the stop condition is satisfied when the following two generating operations are performed: (1) omit the path from "doc( )//row" to "doc( )/*"; and (2) omit the path from "$x//column3" to "$x".

After that, when a return clause is output in the format "return <rec> { ... } </rec>", the DXQuery in FIG. 32 is generated.

Next, the process of generating the VXQuery in FIG. 33 from the XQuery in FIG. 14 and the distributed server definition in FIG. 31 will be further explained.

As the VXQuery, a special XQuery for checking the difference parts generalized by the generalized operations described above (i.e., the difference between "doc( )//row" and "doc( )/*" and the difference between "$x//column3" and "$x") is generated.

For example, the generating unit 232 generates the VXQuery by embedding clauses "for $x in doc( )//row" and "where contains ($x//column3, "Kanagawa")", which contain the difference parts, into a base XQuery as shown in (A) below. In this situation, the generating unit 232 rewrites, as necessary, the variable in the embedded difference parts with the variable in the base XQuery. It is possible to set the base XQuery in advance.

```
(A):
for $_0 in doc([uri_d1])/rec
for $_1 in $_0/col0/*
return
<rec>
{<col0>{$x}</col0>}
</rec>
```

The VXQuery resulting from the embedding process is shown in (B) below.

```
(B):
for $_0 in doc([uri_d1])/rec
for $_1 in $_0/col0/*
for $x in doc $_1//row
where contains ($x//column3, "Kanagawa")
return
<rec>
{<col0>{$x}</col0>}
</rec>
```

In the VXQuery shown above, lines 3 and 4 are embedded. Also, "$x" in line 3 is replaced by "$_1".

As explained above, according to the first and the second embodiments, it is possible to realize the distributed XQuery processing having XQuery transparency, without using XRPC.

Next, a hardware configuration of the searching apparatus (the central server) according to the first or the second embodiment will be explained, with reference to FIG. 35.

Figure 35:
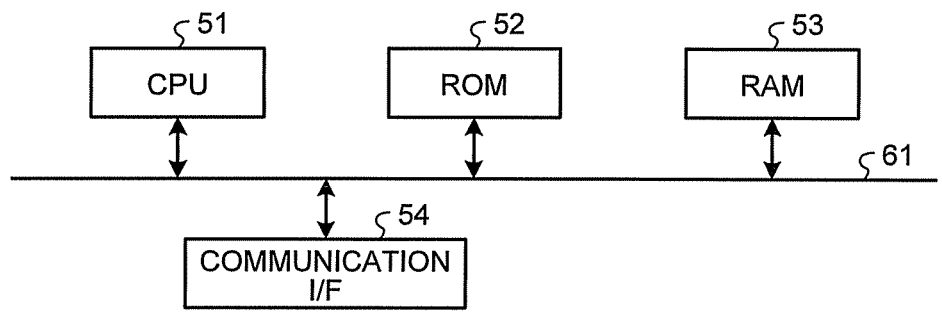
FIG. 35 is a drawing explaining a hardware configuration of a searching apparatus according to the first or the second embodiment.

FIG. 35 is a drawing explaining a hardware configuration of the searching apparatus according to the first or the second embodiment.

The searching apparatus according to the first or the second embodiment has a hardware configuration utilizing a commonly-used computer and includes: a control device such as a Central Processing Unit (CPU) 51; storage devices such as a Read-Only Memory (ROM) 52 and a Random Access Memory (RAM) 53; a communication interface (I/F) 54 that establishes a connection to a network and performs communication; external storage devices such as a Hard Disk Drive (HDD) and/or a Compact Disk (CD) drive device; a display device such as a display monitor; input devices such as a keyboard and/or a mouse; and a bus 61 that connects these constituent elements together.

A searching computer program (hereinafter, "searching program") executed by the searching apparatus according to the first or the second embodiment is provided as a computer program product as being recorded on a computer-readable recording medium such as a Compact Disk Read-Only Memory (CD-ROM), a Flexible Disk (FD), a Compact Disk Recordable (CD-R), a Digital Versatile Disk (DVD), or the like, in a file that is in an installable format or in an executable format.

Another arrangement is acceptable in which the searching program executed by the searching apparatus according to the first or the second embodiment is stored in a computer connected to a network like the Internet, so that the searching program is provided as being downloaded via the network. Yet another arrangement is acceptable in which the searching program executed by the searching apparatus according to the first or the second embodiment is provided or distributed via a network like the Internet.

Further, yet another arrangement is acceptable in which the searching program according to the first or the second embodiment is provided as being incorporated in a ROM or the like in advance.

The searching program executed by the searching apparatus according to the first or the second embodiment has a module configuration that includes the functional units described above (e.g., the request receiving unit, the virtual planner, the XQuery processor, the resource allocating unit, and the server notification detecting unit). As the actual hardware configuration, these functional units are loaded into a main storage device when the CPU 51 (the processor) reads and executes the searching program from the storage device described above, so that these functional units are generated in the main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A searching apparatus connected via a network to a client and a plurality of servers storing therein data, the searching apparatus comprising:
   a first receiving unit that receives, from the client, a search request in an XQuery format requesting a search in the data;
   a first generating unit that, based on the search request, generates a distributed search request in an XQuery format to request each of the plurality of servers to conduct a search in the data and an integration request in an XQuery format to integrate search results of the distributed search request;
   a first transmitting unit that transmits the distributed search request to each of the plurality of servers;
   a second transmitting unit that transmits identification information of an execution result of the integration request to the client;
   a second receiving unit that receives, from the client, an obtainment request to obtain the execution result identified by the identification information;
   a receiving unit that receives, from each of the plurality of servers, a search result in an XML format resulting from the distributed search request;
   an executing unit that executes the integration request on the search results respectively received from the plurality of servers;
   a third transmitting unit that transmits the execution result of the integration request to the client that transmitted the obtainment request; and
   a processor for executing at least the first generating unit, wherein
   the search request includes at least one of doc( )functions of an XQuery, and
   the first generating unit generates, for each of the doc( ) functions, the distributed search request that includes the doc( ) function and path expressions that are obtained by tracing the doc( ) function as a starting point.

2. The apparatus according to claim 1, further comprising:
   an allocating unit that reserves an area for storing therein the execution result of the integration request and allocates identification information of the area to the execution result, wherein
   the second transmitting unit transmits the allocated identification information to the client,
   the executing unit stores the execution result of the integration request into the area, and
   the third transmitting unit transmits the execution result stored in the area, to the client that transmitted the obtainment request.

3. The apparatus according to claim 1 further comprising:
   a converting unit that converts the distributed search request into a search request in an XQuery format that satisfies a searching capability of each of the servers; and
   a second generating unit that generates a generation request in an XQuery format to generate a search result of the distributed search request from a search result of the converted search request, wherein
   the first transmitting unit transmits the converted search request to each of the servers,
   the receiving unit receives the search result of the converted search request from each of the servers, and
   the executing unit further executes the generation request on the received search results and executes the integration request on an execution result of the generation request.

4. The apparatus according to claim 3, wherein the converting unit converts the distributed search request into the search request that satisfies the searching capability of each of the servers by performing at least one of the following:
   omitting a path contained in the distributed search request;
   expanding an OR condition; and
   converting a name of an element contained in the data.

5. The apparatus according to claim 1, further comprising:
a detecting unit that detects the servers connected to the network, wherein
the first transmitting unit transmits the distributed search request to the detected servers.

6. A searching method implemented by a searching apparatus connected, via a network, to a client and a plurality of servers storing therein data, the searching method comprising:
receiving, from the client, a search request in an XQuery format requesting a search in the data;
generating, based on the search request, a distributed search request in an XQuery format to request each of the plurality of servers to conduct a search in the data and an integration request in an XQuery format to integrate search results of the distributed search request;
transmitting the distributed search request to each of the plurality of servers;
transmitting identification information of an execution result of the integration request to the client;
receiving, from the client, an obtainment request to obtain the execution result identified by the identification information;
receiving, from each of the plurality of servers, a search result in an XML format resulting from the distributed search request;
executing the integration request on the search results respectively received from the plurality of servers; and
transmitting the execution result of the integration request to the client that transmitted the obtainment request, wherein
the search request includes at least one of doc( ) functions of an XQuery, and
the generating of the distributed search request that includes the doc( ) function and path expressions that are obtained by tracing the doc( ) function as a starting point is performed for each of the doc( ) functions.

7. A computer program product having a non-transitory computer readable medium including programmed instructions to search in data, wherein the instructions, when executed by a computer, cause the computer to perform:
receiving, from a client, a search request in an XQuery format requesting a search in the data;
generating, based on the search request, a distributed search request in an XQuery format to request each of plurality of servers to conduct a search in the data and an integration request in an XQuery format to integrate search results of the distributed search request;
transmitting the distributed search request to each of the plurality of servers;
transmitting identification information of an execution result of the integration request to the client; receiving, from the client, an obtainment request to obtain the execution result identified by the identification information;
receiving, from each of the plurality of servers, a search result in an XML format resulting from the distributed search request;
executing the integration request on the search results respectively received from the plurality of servers; and
transmitting the execution result of the integration request to the client that transmitted the obtainment request, wherein
the search request includes at least one of doc( ) functions of an XQuery, and
the generating of the distributed search request that includes the doc( ) function and path expressions that are obtained by tracing the doc( ) function as a starting point is performed for each of the doc( ) functions.

8. A searching apparatus connected via a network to a client and a plurality of servers storing therein data, the searching apparatus comprising:
a first receiving unit that receives, from the client, a search request in an XQery format requesting a search in the data;
a first generating unit that, based on the search request, generates a distributed search request in an XQuery format to request each of the plurality of servers to conduct a search in the data and an integration request in an XQuery format to integrate search results of the distributed search request;
a first transmitting unit that transmits the distributed search request to each of the plurality of servers;
a second transmitting unit that transmits identification information of an execution result of the integration request to the client;
a second receiving unit that receives, from the client, an obtainment request to obtain the execution result identified by the identification information;
a receiving unit that receives, from each of the plurality of servers, a search result in an XML format resulting from the distributed search request;
an executing unit that executes the integration request on the search results respectively received from the plurality of servers;
a third transmitting unit that transmits the execution result of the integration request to the client that transmitted the obtainment request; and
a processor for executing at least the first generating unit, wherein
the search request includes at least one of functions that specify the data to be searched, and
the first generating unit generates, for each of the functions, the distributed search request that includes the function and path expressions under the function, wherein
the first generating unit generates the integration request by replacing a part of the search request that includes the function with a let clause or a for clause for extracting the data from the execution result.

* * * * *